(12) United States Patent
Steenhoek et al.

(10) Patent No.: US 12,100,171 B2
(45) Date of Patent: Sep. 24, 2024

(54) SYSTEMS AND METHODS FOR MATCHING COLOR AND APPEARANCE OF TARGET COATINGS

(71) Applicant: AXALTA COATING SYSTEMS IP CO., LLC, Wilmington, DE (US)

(72) Inventors: Larry E. Steenhoek, Wilmington, DE (US); Dominic V. Poerio, Philadelphia, PA (US)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 126 days.

(21) Appl. No.: 17/123,531

(22) Filed: Dec. 16, 2020

(65) Prior Publication Data
US 2021/0201513 A1 Jul. 1, 2021

Related U.S. Application Data

(60) Provisional application No. 62/955,726, filed on Dec. 31, 2019.

(51) Int. Cl.
*G06T 7/00* (2017.01)
*B05B 12/08* (2006.01)
*G06T 7/40* (2017.01)
*G06T 7/90* (2017.01)

(52) U.S. Cl.
CPC .............. *G06T 7/40* (2013.01); *B05B 12/084* (2013.01); *G06T 7/0004* (2013.01); *G06T 7/90* (2017.01); *G06T 2207/10024* (2013.01); *G06T 2207/20081* (2013.01); *G06T 2207/20084* (2013.01); *G06T 2207/30164* (2013.01)

(58) Field of Classification Search
None
See application file for complete search history.

(56) References Cited

U.S. PATENT DOCUMENTS

| | | | |
|---|---|---|---|
| 10,352,692 B1* | 7/2019 | Kato | G01J 3/51 |
| 2004/0252308 A1 | 12/2004 | Prakash et al. | |
| 2007/0172113 A1* | 7/2007 | Sai | G01N 21/25 |
| | | | 382/162 |
| 2010/0027870 A1* | 2/2010 | Rodrigues | G06T 7/0004 |
| | | | 382/141 |
| 2011/0246087 A1 | 10/2011 | Prakash et al. | |

(Continued)

FOREIGN PATENT DOCUMENTS

| | | |
|---|---|---|
| EP | 1814044 A1 | 8/2007 |
| EP | 2089691 A1 | 8/2009 |

(Continued)

OTHER PUBLICATIONS

Andrearczyk, Vincent, and Paul F. Whelan. "Using filter banks in convolutional neural networks for texture classification." Pattern Recognition Letters 84 (2016): 63-69. (Year: 2016).*

(Continued)

*Primary Examiner* — Sean M Conner
(74) *Attorney, Agent, or Firm* — Lorenz & Kopf, LLP

(57) ABSTRACT

A system and method include receiving target image data associated with a target coating. A texture feature extraction analysis process is applied to the target image data to determine a target texture image feature. A machine learning model identifies one or more texture features for matching to a target coating.

18 Claims, 29 Drawing Sheets

(56) References Cited

U.S. PATENT DOCUMENTS

| | | | |
|---|---|---|---|
| 2014/0242271 A1* | 8/2014 | Prakash | B60S 5/00 |
| | | | 356/73 |
| 2016/0321546 A1 | 11/2016 | Delespierre et al. | |
| 2018/0322327 A1* | 11/2018 | Smith | G06V 10/82 |
| 2019/0172228 A1* | 6/2019 | Steenhoek | G06T 7/90 |
| 2021/0027524 A1* | 1/2021 | Moss | G06V 10/751 |
| 2022/0107222 A1* | 4/2022 | Bischoff | G01N 21/25 |

FOREIGN PATENT DOCUMENTS

| | | |
|---|---|---|
| EP | 3746933 A1 | 12/2020 |
| WO | 2013049792 A1 | 4/2013 |
| WO | 2019113605 A1 | 6/2019 |
| WO | WO-2020262615 A1 * | 12/2020 |

OTHER PUBLICATIONS

Maile F J et al. "Effect pigments-past, present and future", Progress in Organic Coatings, Elsevier BV, NL, Nov. 2005 (Nov. 1, 2005), pp. 150-163, vol. 54, No. 3,1.
EPO, European Extended Search Report issued in EP App. No. 20214836.7, dated May 11, 2021.
EPO, Extended European Search Report, Application No. 20214826.8 dated May 11, 2021.

* cited by examiner

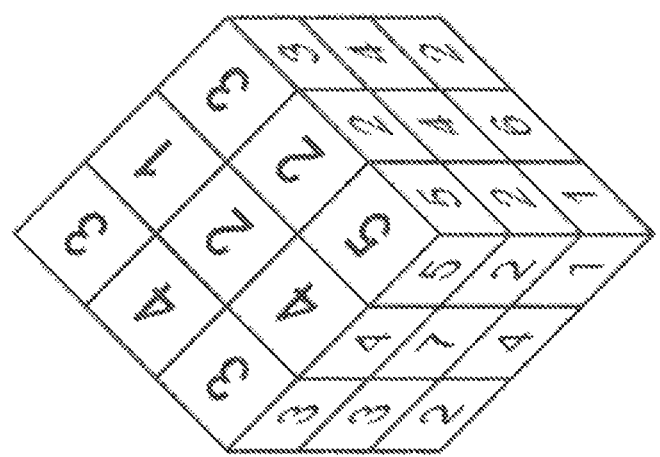
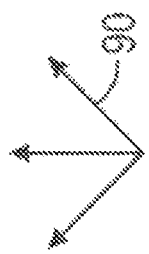
FIG. 16

SYSTEMS AND METHODS FOR MATCHING COLOR AND APPEARANCE OF TARGET COATINGS

CROSS-REFERENCE TO RELATED APPLICATIONS

This application claims priority to U.S. Provisional Patent Application No. 62/955,726, filed Dec. 31, 2019, the entire contents of which are hereby incorporated by reference.

TECHNICAL FIELD

The technical field is directed to coatings technology and more particularly to systems and methods for matching color and appearance of target coatings.

BACKGROUND

Visualization and selection of coatings having a desired color and appearance play an important role in many applications. For example, paint suppliers must provide thousands of coatings to cover the range of global OEM manufacturers' coatings for all current and recent model vehicles. Providing this large number of different coatings as factory package products adds complexity to paint manufacture and increases inventory costs. Consequently, paint suppliers provide a mixing machine system including typically 50 to 100 components (e.g., single pigment tints, binders, solvents, additives) with coating formulas for the components that match the range of coatings of vehicles. The mixing machine may reside at a repair facility (i.e., body shop) or a paint distributor and allows a user to obtain the coating having the desired color and appearance by dispensing the components in amounts corresponding to the coating formula. The coating formulas are typically maintained in a database and are distributed to customers via computer software by download or direct connection to internet databases. Each of the coating formulas typically relate to one or more alternate coating formulas to account for variations in coatings due to variations in vehicle production.

Identification of the coating formula most similar to a target coating is complicated by this variation. For example, a particular coating might appear on three vehicle models, produced in two assembly plants with various application equipment, using paint from two OEM paint suppliers, and over a lifetime of five model years. These sources of variation result in significant coating variation over the population of vehicles with that particular coating. The alternate coating formulas provided by the paint supplier are matched to subsets of the color population so that a close match is available for any vehicle that needs repair. Each of the alternate coating formulas can be represented by a color chip in the fan deck which enables the user to select the best matching formula by visual comparison to the vehicle.

Identifying the coating formula most similar to the target coating for a repair is typically accomplished through either the use a spectrophotometer or a fandeck. Spectrophotometers measure one or more color and appearance attributes of the target coating to be repaired. This color and appearance data is then compared with the corresponding data from potential candidate formulas contained in a database. The candidate formula whose color and appearance attributes best match those of the target coating to be repaired is then selected as the coating formula most similar to the target coating. However, spectrophotometers are expensive and not readily available in economy markets.

Alternatively, fandecks include a plurality of sample coating layers on pages or patches within the fandeck. The sample coating layers of the fandeck are then visually compared to the target coating being repaired. The formula associated with the sample coating layer best matching the color and appearance attributes of the target coating to be repaired is then selected as the coating formula most similar to the target coating. However, fandecks are cumbersome to use and difficult to maintain due to the vast number of sample coating layers necessary to account for all coatings on vehicles on the road today.

As such, it is desirable to provide a system and a method for matching color and appearance of a target coating. In addition, other desirable features and characteristics will become apparent from the subsequent summary and detailed description, and the appended claims, taken in conjunction with the accompanying drawings and this background.

SUMMARY

Various non-limiting embodiments of a system for matching color and appearance of a target coating, and various non-limiting embodiments of methods for the same, are disclosed herein. In one non-limiting embodiment, a system and method includes, but is not limited to, a storage device for storing instructions, and one or more data processors. The one or more data processors are configured to execute instructions to receive a target image of the target coating. The target image comprises target image data. A texture feature extraction analysis process is applied to the target image data to determine target image texture features. The feature extraction analysis process includes determining distribution of particle sizes within sub-images of the target image. Target texture features are determined for the sub-images. A machine learning model is applied to match texture features present in the target coating using the determined target pixel features.

A system and method can also include receiving target image data associated with a target coating. A texture feature extraction analysis process is applied to the target image data to determine a target texture image feature. A machine learning model identifies one or more texture features for matching to a target coating.

BRIEF DESCRIPTION OF THE DRAWINGS

Other advantages of the disclosed subject matter will be readily appreciated, as the same becomes better understood by reference to the following detailed description when considered in connection with the accompanying drawings wherein:

FIG. 16 is a hypothetical diagram illustrating one possible portion of a technique to determine a target and/or sample feature.

DETAILED DESCRIPTION

Figure 1:
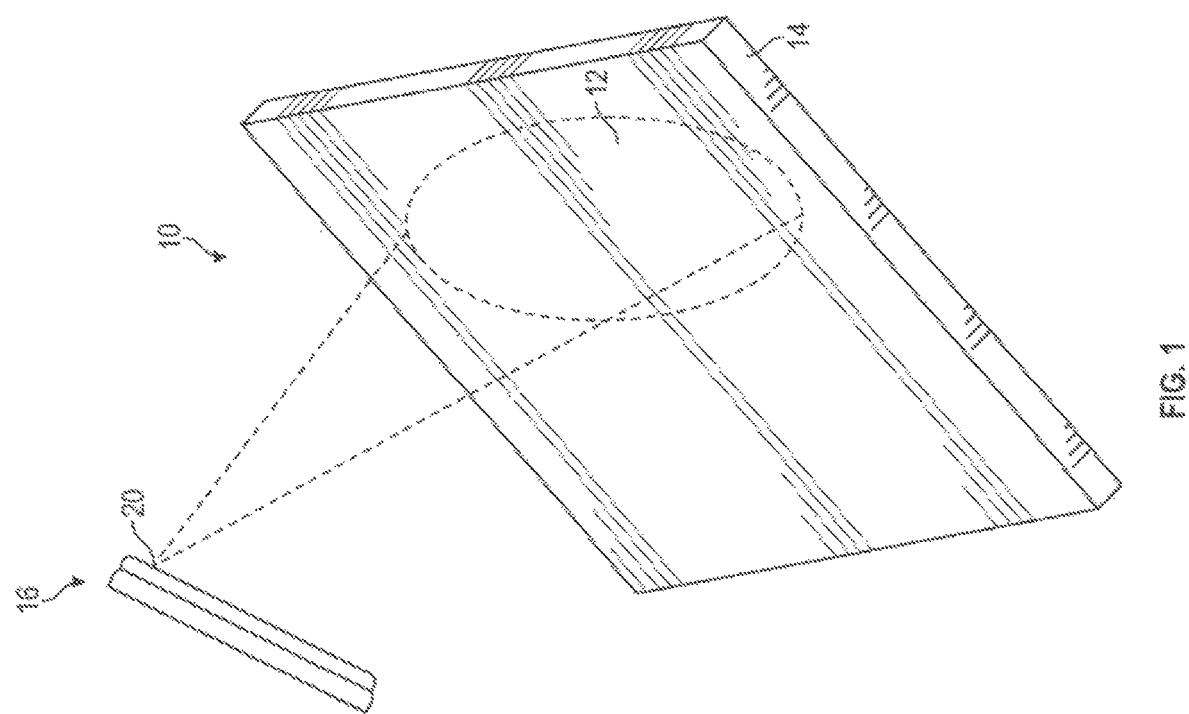
FIG. 1 is a perspective view illustrating a non-limiting embodiment of a system for matching color and appearance of a target coating.

The following detailed description includes examples and is not intended to limit the invention or the application and uses of the invention. Furthermore, there is no intention to be bound by any theory presented in the preceding background or the following detailed description. It should be understood that throughout the drawings, corresponding reference numerals indicate like or corresponding parts and features.

The features and advantages identified in the present disclosure will be more readily understood, by those of ordinary skill in the art, from reading the following detailed description. It is to be appreciated that certain features, which are, for clarity, described above and below in the context of separate embodiments, may also be provided in combination in a single embodiment. Conversely, various features that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this disclosure, unless expressly indicated otherwise, are stated as approximations as though the minimum and maximum values within the stated ranges were both proceeded by the word "about." In this manner, slight variations above and below the stated ranges can be used to achieve substantially the same results as values within the ranges. Also, the disclosure of these ranges is intended as a continuous range including every value between the minimum and maximum values.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one example of an arrangement of elements, additional intervening elements, devices, features, or components may be present in an embodiment of the depicted subject matter. In addition, certain terminology may also be used in the following description for the purpose of reference only, and thus are not intended to be limiting.

Techniques and technologies may be described herein in terms of functional and/or logical block components and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to graphics and image processing, touchscreen displays, and other functional aspects of certain systems and subsystems (and the individual operating components thereof) may not be described in detail herein. Furthermore, the connecting lines shown in the various figures contained herein are intended to represent an example of functional relationships and/or physical couplings between the various elements. It should be noted that many alternative or additional functional relationships or physical connections may be present in an embodiment of the subject matter.

As used herein, the term "module" refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

As used herein, the term "pigment" or "pigments" refers to a colorant or colorants that produce color or colors. A pigment can be from natural or synthetic sources and can be made of organic or inorganic constituents. Pigments can also include metallic particles or flakes with specific or mixed shapes and dimensions. A pigment is usually not soluble in a coating composition.

The term "effect pigment" or "effect pigments" refers to pigments that produce special effects in a coating. Examples of effect pigments include, but are not limited to, light scattering pigments, light interference pigments, and light reflecting pigments. Metallic flakes, such as aluminum flakes, and pearlescent pigments, such as mica-based pigments, are examples of effect pigments.

The term "appearance" can include: (1) the aspect of visual experience by which a coating is viewed or recognized; and (2) perception in which the spectral and geometric aspects of a coating is integrated with its illuminating and viewing environment. In general, appearance includes texture, coarseness, sparkle, or other visual effects of a coating, especially when viewed from varying viewing angles and/or with varying illumination conditions. Appearance characteristics or appearance data can include, but not limited to, descriptions or measurement data on texture, metallic effect, pearlescent effect, gloss, distinctness of image, flake appearances and sizes such as texture, coarseness, sparkle, glint and glitter as well as the enhancement of depth perception in the coatings imparted by the flakes, especially produced by metallic flakes, such as aluminum flakes. Appearance characteristics can be obtained by visual inspection or by using an appearance measurement device.

The term "color data" or "color characteristics" of a coating can comprise measured color data including spectral reflectance values, C,U,Z values, L*, a*, b* values, L*,a*,b* values, L,C,h values, or a combination thereof. Color data can further comprise a color code of a vehicle, a color name or description, or a combination thereof. Color data can even further comprise visual aspects of color of the coating, chroma, hue, lightness or darkness. The color data can be obtained by visual inspection, or by using a color measurement device such as a colorimeter, a spectrophotometer, or a goniospectrophotometer. In particular, spectrophotometers obtain color data by determining the wavelength of light reflected by a coating layer. The color data can also comprise descriptive data, such as a name of a color, a color code of a vehicle; a binary, textural or encrypted data file containing descriptive data for one or more colors; a measurement data file, such as those generated by a color measuring device; or an export/import data file generated by a computing device or a color measuring device. Color data can also be generated by an appearance measuring device or a color-appearance dual measuring device.

The term "coating" or "coating composition" can include any coating compositions known to those skilled in the art and can include a two-pack coating composition, also known as "2K coating composition"; a one-pack or 1K coating composition; a coating composition having a cross-linkable component and a crosslinking component; a radiation curable coating composition, such as a UV curable coating composition or an E-beam curable coating composition; a mono-cure coating composition; a dual-cure coating composition; a lacquer coating composition; a waterborne coating composition or aqueous coating composition; a solvent borne coating composition; or any other coating compositions known to those skilled in the art. The coating composition can be formulated as a primer, a basecoat, or a color coat composition by incorporating desired pigments or effect pigments. The coating composition can also be formulated as a clearcoat composition.

The term "vehicle", "automotive", "automobile" or "automotive vehicle" can include an automobile, such as car, bus, truck, semi-truck, pickup truck, SUV (Sports Utility Vehicle); tractor; motorcycle; trailer; ATV (all-terrain vehicle); heavy duty mover, such as, bulldozer, mobile crane and earth mover; airplanes; boats; ships; and other modes of transport.

The term "formula," "matching formula," or "matching formulation" for a coating composition refers to a collection of information or instruction, based upon that, the coating composition can be prepared. In one example, a matching formula includes a list of names and quantities of pigments, effect pigments, and other components of a coating composition. In another example, a matching formula includes instructions on how to mix multiple components of a coating composition.

A processor-implemented system 10 for matching color and appearance of a target coating 12 is provided herein with reference to FIG. 1. The target coating 12 may be on a substrate 14. The substrate 14 may be a vehicle or parts of a vehicle. The substrate 14 may also be any coated article including the target coating 12. The target coating 12 may include a color coat layer, a clearcoat layer, or a combination of a color coat layer and a clearcoat layer. The color coat layer may be formed from a color coat composition. The clearcoat layer may be formed from a clearcoat coating composition. The target coating 12 may be formed from one or more solvent borne coating compositions, one or more waterborne coating compositions, one or more two-pack coating compositions or one or more one-pack coating compositions. The target coating 12 may also be formed from one or more coating compositions each having a crosslinkable component and a crosslinking component, one or more radiation curable coating compositions, or one or more lacquer coating compositions.

Figure 2:
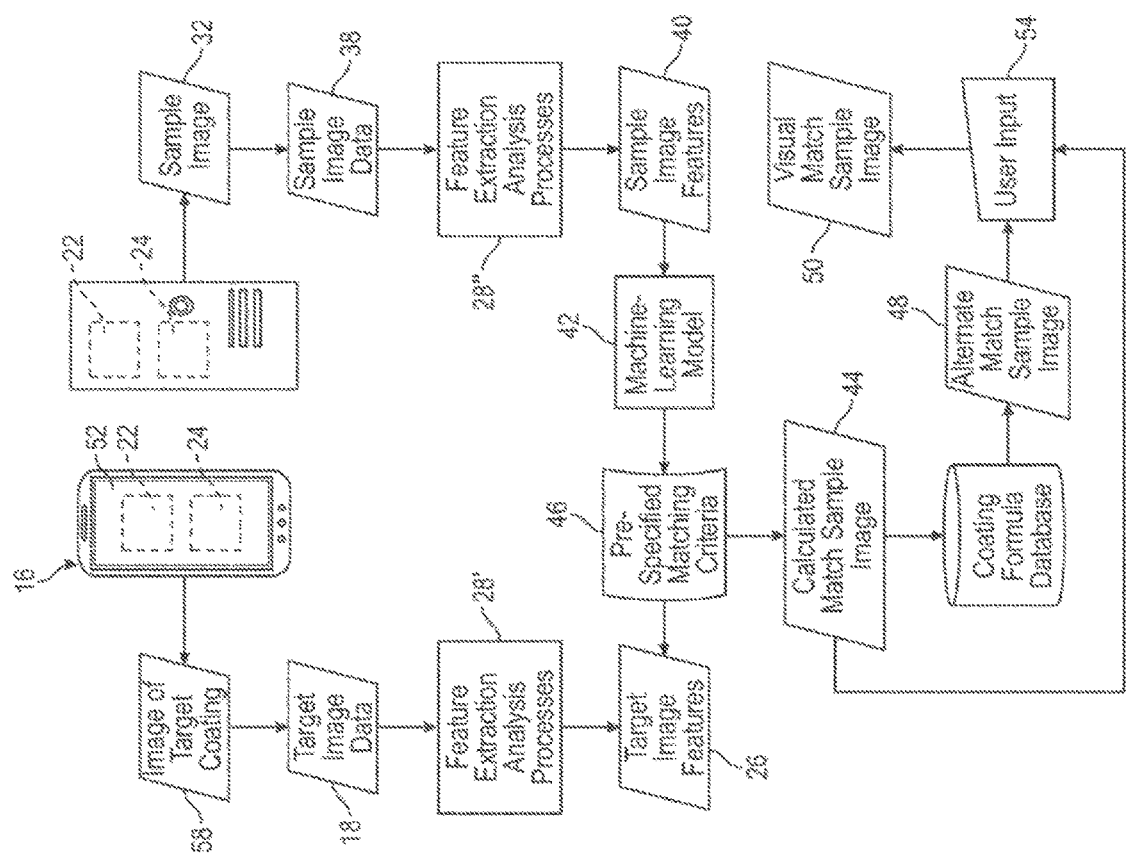
FIG. 2 is a block diagram illustrating a non-limiting embodiment of the system of FIG. 1.

With reference to FIG. 2 and continued reference to FIG. 1, the system 10 includes an electronic imaging device 16 configured to generate target image data 18 of the target coating 12. The electronic imaging device 16 may be a device that can capture images under a wide range of electromagnetic wavelengths including visible or invisible wavelengths. The electronic imaging device 16 may be further defined as a mobile device. Examples of mobile devices include, but are not limited to, a mobile phone (e.g., a smartphone), a mobile computer (e.g., a tablet or a laptop), a wearable device (e.g., smart watch or headset), or any other type of device known in the art configured to receive the target image data 18. In one embodiment, the mobile device is a smartphone or a tablet.

Figure 7:
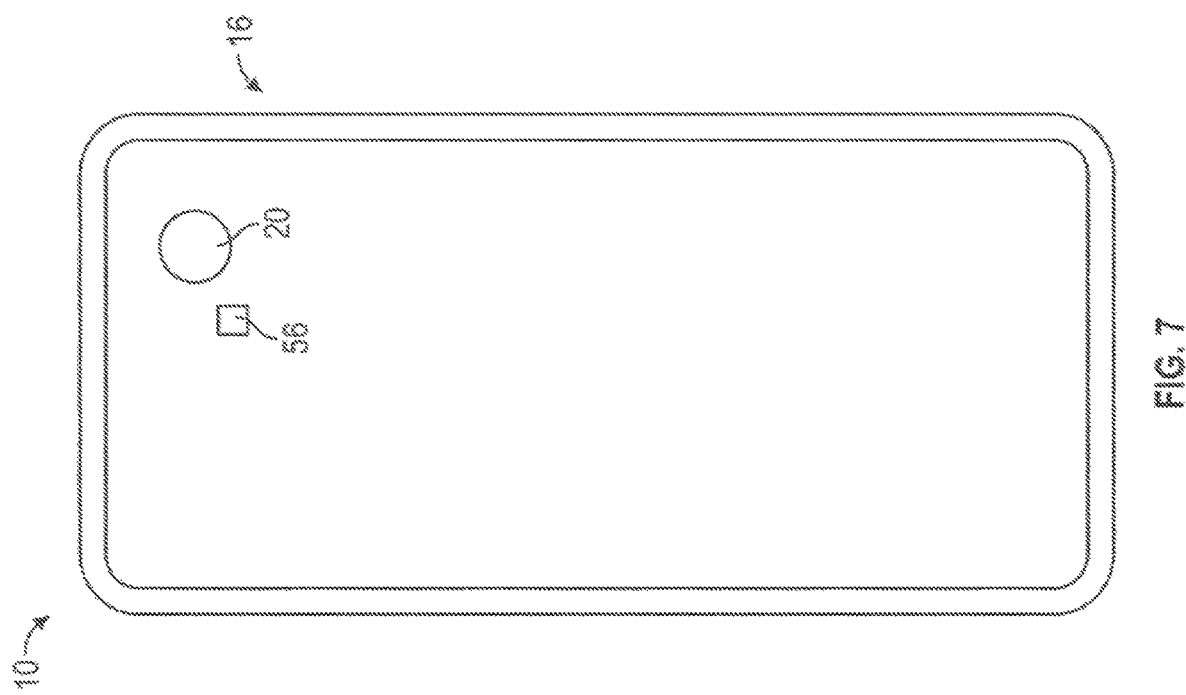
FIG. 7 is another perspective view illustrating a non-limiting embodiment of an electronic imaging device of the system of FIG. 1.

In embodiments, the electronic imaging device 16 includes a camera 20 (see FIG. 7). The camera 20 may be configured to obtain the target image data 18. The camera 20 may be configured to capture images having visible wavelengths. The target image data 18 may be derived from a target image 58 of the target coating 12, such as a still image or a video. In certain embodiments, the target image data 18 is derived from a still image. In the embodiment shown in FIG. 1, the electronic imaging device 16 is shown disposed in the proximity of and spaced from the target coating 12. However, it should be appreciated that the electronic imaging device 16 of the embodiment is portable, such that it may be moved to another coating (not shown). In other embodiments (not shown), the electronic imaging device 16 may be fixed at a location. In yet other embodiments (not shown), the electronic imaging device 16 may be attached to a robotic arm to be moved automatically. In further embodiments (not shown), the electronic imaging device 16 may be configured to measure characteristics of multiple surfaces simultaneously.

The system 10 further includes a storage device 22 for storing instructions for performing the matching of color and appearance of the target coating 12. The storage device 22 may store instructions that can be performed by one or more data processors 24. The instructions stored in the storage device 22 may include one or more separate programs, each of which includes an ordered listing of executable instructions for implementing logical functions. When the system 10 is in operation, the one or more data processors 24 are configured to execute the instructions stored within the storage device 22, to communicate data to and from the storage device 22, and to generally control operations of the system 10 pursuant to the instructions. In certain embodiments, the storage device 22 is associated with (or alternatively included within) the electronic imaging device 16, a server associated with the system 10, a cloud-computing environment associated with the system 10, or combinations thereof.

As introduced above, the system 10 further includes the one or more data processors 24 configured to execute the instructions. The one or more data processors 24 are configured to be communicatively coupled with the electronic imaging device 16. The one or more data processors 24 can be any custom made or commercially available processor, a central processing unit (CPU), an auxiliary processor among several processors associated with the electronic imaging device 16, a semiconductor based microprocessor (in the form of a microchip or chip set), or generally any device for executing instructions. The one or more data processors 24 may be communicatively coupled with any component of the system 10 through wired connections, wireless connections and/or devices, or a combination thereof. Examples of suitable wired connections includes, but are not limited to, hardware couplings, splitters, connectors, cables or wires. Examples of suitable wireless connections and devices include, but not limited to, Wi-Fi device, Bluetooth device, wide area network (WAN) wireless device, Wi-Max device, local area network (LAN) device, 3G broadband device, infrared communication device, optical data transfer device, radio transmitter and optionally receiver, wireless phone, wireless phone adaptor card, or any other devices that can transmit signals in a wide range of electromagnetic wavelengths including radio frequency, microwave frequency, visible or invisible wavelengths.

Figure 3A:
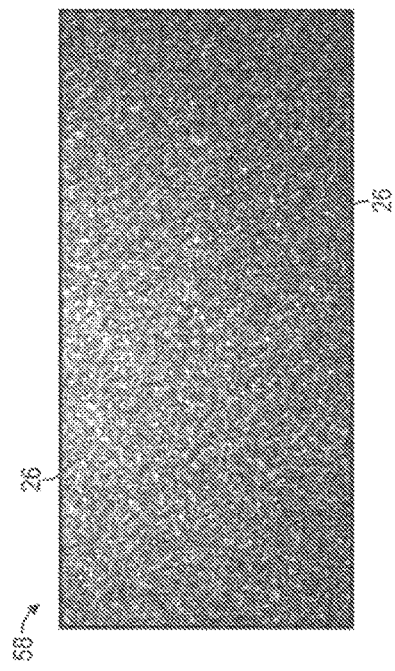
FIG. 3A is an image illustrating a non-limiting embodiment of the target coating of FIG. 1.
Figure 3B:
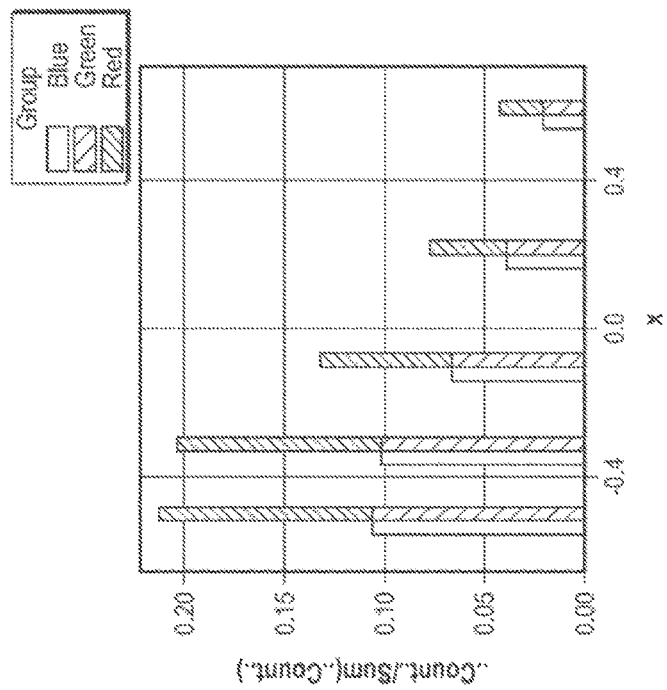
FIG. 3B is a graphical representation of RGB values illustrating a non-limiting embodiment of the target coating of FIG. 2A.

With reference to FIGS. 3A and 3B, the one or more data processors 24 are configured to execute the instructions to receive, by the one or more data processors 24, target image data 18 of the target coating 12. As described above, the target image data 18 is generated by the electronic imaging device 16. The target image data 18 may define RGB values, L*a*b* values, or a combination thereof, representative of the target coating 12. In certain embodiments, the target image data 18 defines the RGB values representative of the target coating 12. The one or more data processors 24 may be further configured to execute the instructions to transform the RGB values of the target image data 18 to L*a*b* values representative of the target coating 12.

The target image data 18 includes target image features 26. The target image features 26 may include color and appearance characteristics of the target coating 12, representations of the target image data 18, or a combination thereof. In certain embodiments, the target image features 26 may include representations based on image entropy.

The one or more data processors 24 are configured to execute the instructions to retrieve, by the one or more data processors 24, one or more feature extraction analysis processes 28' that extract the target image features 26 from the target image data 18. In embodiments, the one or more feature extraction analysis processes 28' are configured to identify the representation based on image entropy for extracting the target image features 26 from the target image data 18. To this end, the one or more data processors 24 may be configured to execute the instructions to identify the representation based on image entropy for extracting the target image features 26 from the target image data 18.

Identifying the representation based on image entropy may include determining color image entropy curves for the target image data 18. The target image data 18 may be represented in a three-dimensional L*a*b* space with the color entropy curves based on Shannon entropy of each of the a*b* planes, of each of the L*a* planes, of each of the L*b* planes, or combinations thereof. The determination of the color entropy curves may include dividing the three-dimensional L*a*b* space of the target image data 18 into a plurality of cubic subspaces, tabulating the cubic spaces having similar characteristics to arrive at a total cubic space count for each characteristic, generating empty image entropy arrays for each of the dimensions of the three-dimensional L*a*b* space, and populating the empty image entropy arrays with the total cubic space counts corresponding to each of the dimensions.

Identifying the representation based on image entropy may also include determining color difference image entropy curves for the target image data 18. The target image data 18 may be represented in a three-dimensional L*a*b* space with the three-dimensional L*a*b* space analyzed in relation to an alternative three-dimensional L*a*b* space. The determination of the color difference entropy curves may include calculating dL* image entropy, dC* image entropy, and dh* image entropy between the three-dimensional L*a*b* space and the alternative three-dimensional L*a*b* space.

Identifying the representation based on image entropy may also include determining black and white intensity image entropy from the L* plane of the three-dimensional L*a*b* space of the target image data 18. Identifying the representation based on image entropy may also include determining average L*a*b* values of the target image data 18. Identifying the representation based on image entropy may also include determining L*a*b* values for the center of the most populated cubic subspace.

The one or more data processors 24 are also configured to execute the instructions described above to apply the target image data 18 to the one or more feature extraction analysis processes 28'. The one or more data processors 24 are further configured to execute the instructions described above to extract the target image features 26 from the target image data 18 utilizing the one or more feature extraction analysis processes 28'.

In an embodiment, the system 10 is configured to extract the target image features 26 from the target image data 18 by identifying the representation based on image entropy of the target image features 26. Identifying the representation based on image entropy may include determining color image entropy curves for the target image data 18, determining color image entropy curves for the target image data 18, determining black and white intensity image entropy from the L* plane of the three-dimensional L*a*b* space of the target image data 18, determining average L*a*b* values of the target image data 18, determining L*a*b* values for the center of the most populated cubic subspace, or combinations thereof.

Figure 4A:
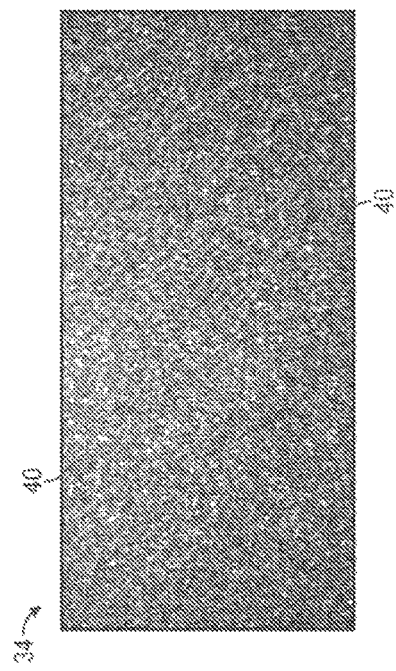
FIG. 4A is an image illustrating a non-limiting embodiment of a first sample image of the system of FIG. 1.
Figure 5A:
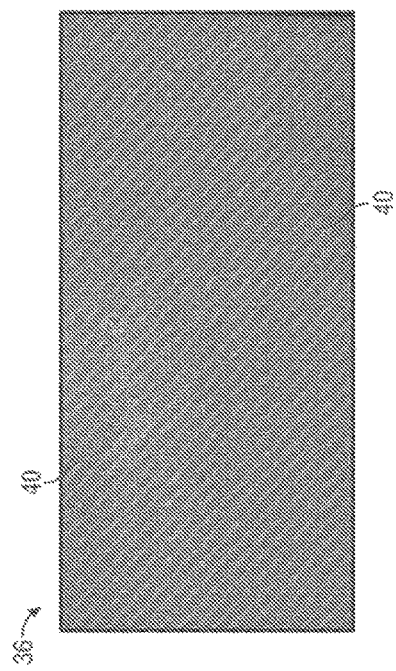
FIG. 5A is an image illustrating a non-limiting embodiment of a second sample image of the system of FIG. 1.

With reference to FIG. 4A and 5A and continuing to reference to FIG. 2, in embodiments, the system 10 further includes a sample database 30. The sample database 30 may be associated with the electronic imaging device 16 or separate from the electronic imaging device 16, such as in a server-based or in a cloud computing environment. It is to be appreciated that the one or more data processors 24 are configured to be communicatively coupled with the sample database 30. The sample database 30 may include a plurality of sample images 32, such as a first sample image 34 as shown in FIG. 4A and a second sample image 36 as shown in FIG. 5A. In embodiments, each of the plurality of sample images 32 is an image of a panel including a sample coating. A variety of sample coatings, defining a set of coating formulas, may be imaged to generate the plurality of sample images 32. The sample images 32 may be imaged utilizing one or more different electronic imaging devices 16 to account for variations in imaging abilities and performance of each of the electronic imaging devices 16. The plurality of sample images 32 may be in any format, such as RAW, JPEG, TIFF, BMP, GIF, PNG, and the like.

Figure 4B:
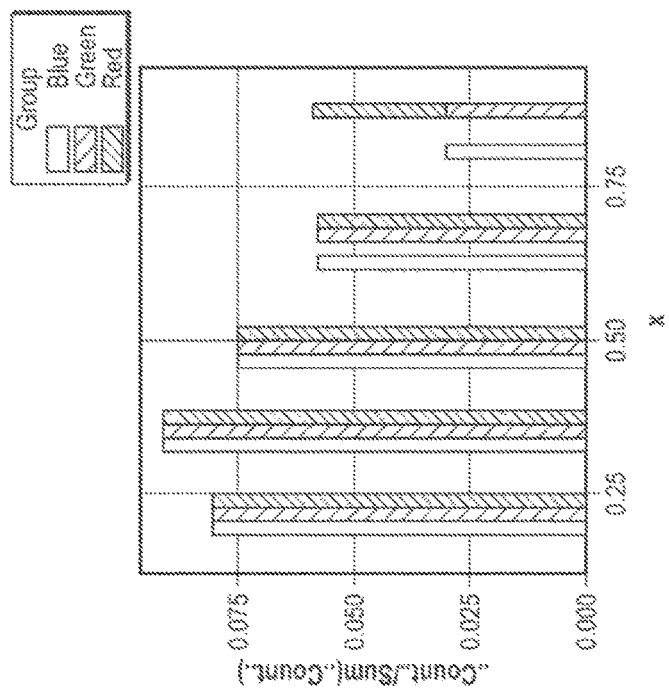
FIG. 4B is a graphical representation of RGB values illustrating a non-limiting embodiment of the first sample image of FIG. 4A.
Figure 5B:
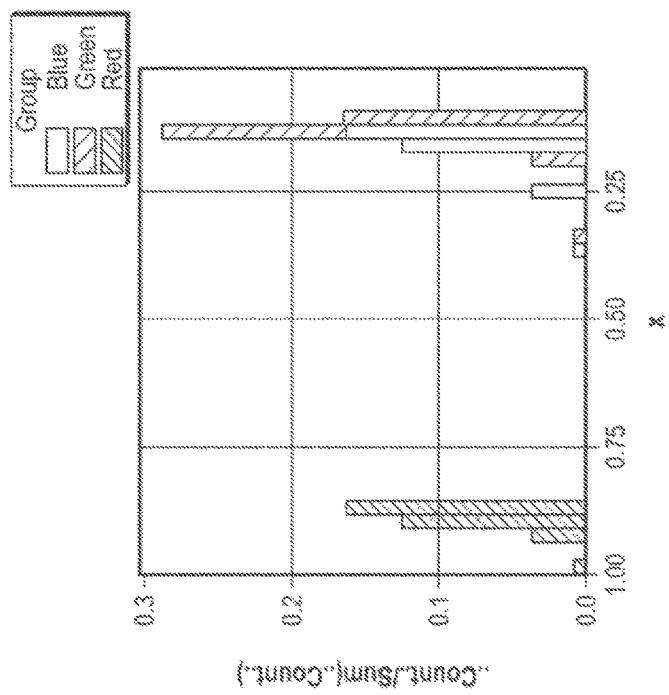
FIG. 5B is a graphical representation of RGB values illustrating a non-limiting embodiment of the second sample image of FIG. 5A.

The one or more data processors 24 may be configured to execute the instructions to receive, by the one or more data processors 24, sample image data 38 of the sample images 32. The sample image data 38 may be generated by the electronic imaging device 16. The sample image data 38 may define RGB values, L*a*b* values, or a combination thereof, representative of the sample images 32. In certain embodiments, the sample image data 38 defines the RGB values representative of the sample images 32, such as shown in FIG. 4B for the first sample image 34 and FIG. 5B for the second sample image 36. The one or more data processors 24 may be further configured to execute the instructions to transform the RGB values of the sample image data 38 to L*a*b* values representative of the sample images 32. The system 10 may be configured to normalize the sample image data 38 of the plurality of sample images 32 for various electronic imaging devices 16 thereby improving performance of the system 10.

The sample image data 38 may include sample image features 40. The sample image features 40 may include color and appearance characteristics of the sample image 32, representations of the sample image data 38, or a combination thereof. In certain embodiments, the sample image features 40 may include representations based on image entropy.

The one or more data processors 24 are configured to execute the instructions to retrieve, by the one or more data processors 24, one or more feature extraction analysis processes 28'' that extract the sample image features 40 from the sample image data 38. In embodiments, the one or more feature extraction analysis processes 28'' are configured to identify the representation based on image entropy for extracting the sample image features 40 from the sample image data 38. To this end, the one or more data processors 24 may be configured to execute the instructions to identify the representation based on image entropy for extracting the sample image features 40 from the sample image data 38. It is to be appreciated that the one or more feature extraction analysis processes 28'' utilized to extract the sample image features 40 may be the same as or different than the one or more feature extraction analysis processes 28' utilized to extract the target image features 26.

In an embodiment, the system 10 is configured to extract the sample image features 40 from the sample image data 38 by identifying the representation based on image entropy of the sample image features 40. Identifying the representation based on image entropy may include determining color image entropy curves for the sample image data 38, determining color image entropy curves for the sample image data 38, determining black and white intensity image entropy from the L* plane of the three-dimensional L*a*b* space of the sample image data 38, determining average L*a*b* values of the sample image data 38, determining L*a*b* values for the center of the most populated cubic subspace, or combinations thereof.

The one or more data processors 24 are configured to execute the instructions to retrieve, by one or more data processors, a machine-learning model 42 that identifies a calculated match sample image 44 from the plurality of sample images 32 utilizing the target image features 26. The machine-learning model 42 may utilize supervised training, unsupervised training, or a combination thereof. In an embodiment, the machine-learning model 42 utilizes supervised training. Examples of suitable machine-learning models include, but are not limited to, linear regression, decision tree, k-means clustering, principal component analysis (PCA), random decision forest, neural network, or any other type of machine learning algorithm known in the art. In an embodiment, the machine-learning model is based on a random decision forest algorithm.

The machine-learning model 42 includes pre-specified matching criteria 46 representing the plurality of sample images 32 for identifying the calculated match sample image 44 from the plurality of sample images 32. In embodiments, the pre-specified matching criteria 46 are arranged in one or more decision trees. The one or more data processors 24 are configured to apply the target image features 26 to the machine-learning model 42. In an embodiment, the pre-specified matching criteria 46 are included in one or more decision trees with the decisions trees including root nodes, intermediate nodes through various levels, and end nodes. The target image features 26 may be processed through the nodes to one or more of the end nodes with each of the end nodes representing one of the plurality of sample images 32.

The one or more data processors 24 are also configured to identify the calculated match sample image 44 based upon substantially satisfying one or more of the pre-specified matching criteria 46. In embodiments, the phase "substantially satisfying" means that the calculated match sample image 44 is identified from the plurality of sample images 32 by having the greatest probability for matching the target coating 12. In an embodiment, the machine-learning model 42 is based on a random decision forest algorithm including a plurality of decision trees with outcomes of each of the decisions trees, through processing of the target image features 26, being utilized to determine a probably of each of the sample images 32 matching the target coating 12. The sample image 32 having the greatest probability for matching the target coating 12 may be defined as the calculated match sample image 44.

In embodiments, the one or more data processors 24 are configured to execute the instructions to generate the pre-specified matching criteria 46 of the machine-learning model 42 based on the sample image features 40. In certain embodiments, the pre-specified matching criteria 46 are generated based on the sample image features 40 extracted from the plurality of sample images 32. The one or more data processors 24 may be configured to execute the instructions to train the machine-learning model 42 based on the plurality of sample images 32 by generating the pre-specified matching criteria 46 based on the sample image features 40. The machine-learning model 42 may be trained at regular intervals (e.g., monthly) based on the plurality of sample images 32 included within the sample database 30. As described above, the sample image data 38 defining the RGB values representative of the sample images 32 may be transformed to L*a*b* values with the sample image features 40 extracted from the sample image data 38 including L*a*b* values by identifying the representations based on image entropy.

The calculated match sample image 44 is utilized for matching color and appearance of the target coating 12. The calculated match sample image 44 may correspond to a coating formula potentially matching color and appearance of the target coating 12. The system 10 may include one or more alternate match sample images 48 related to the calculated match sample image 44. The one or more alternate match sample images 48 may relate to the calculated match sample image 44 based on coating formula, observed similarity, calculated similarity, or combinations thereof. In certain embodiments, the one or more alternate match sample images 48 are related to the calculated match sample image 44 based on the coating formula. In embodiments, the calculated match sample image 44 corresponds to a primary coating formula and the one or more alternate match sample images 48 correspond to alternate coating formulas related to the primary coating formula. The system 10 may include a visual match sample image 50, selectable by a user, from the calculated match sample image 44 and the one or more alternate match sample images 48 based on an observed similarity to the target coating 12 by the user.

Figure 6:
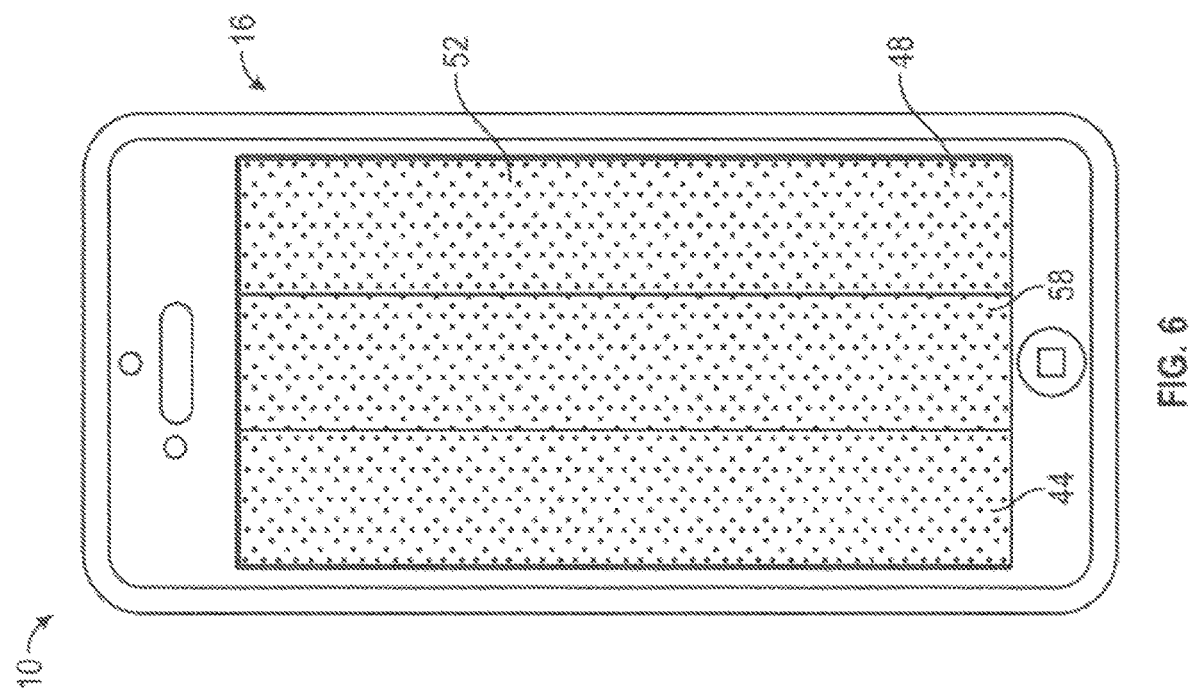
FIG. 6 is a perspective view illustrating a non-limiting embodiment of an electronic imaging device of the system of FIG. 1.

With reference to FIGS. 6 and 7, in embodiments, the electronic imaging device 16 further includes a display 52 configured to display the calculated match sample image 44. In certain embodiments, the display 52 is further configured to display a target image 58 of the target coating 12 adjacent the calculated match sample image 44. In an embodiment, the display 52 is further configured to display the one or more alternate match sample images 48 related to the calculated match sample image 44. In embodiments of the electronic imaging device 16 including the camera 20, the display 52 may be located opposite of the camera 20.

In embodiments, the system 10 further includes a user input module 54 configured to select, by a user, the visual match sample image 50 from the calculated match sample image 44 and the one or more alternate match sample images 48 based on an observed similarity to the target coating 12 by the user. In embodiments of the electronic imaging device 16 including the display 52, the user may select the visual match sample image 50 by touch input on the display 52.

In embodiments, the system 10 further includes a light source 56 configured to illuminate the target coating 12. In embodiments of the electronic imaging device 16 including the camera 20, the electronic imaging device 16 may include the light source 56 and the light source 56 may be located adjacent the camera 20.

In embodiments, the system 10 further includes a dark box (not shown) for isolating the target coating 12 to be imaged from extraneous light, shadows, and reflections. The dark box may be configured to receive the electronic imaging device 16 and permit exposure of target coating 12 to the camera 20 and the light source 56. The dark box may include a light diffuser (not shown) configured to cooperate with the light source 56 for sufficiently diffusing the light generated from the light source 56.

Figure 8:
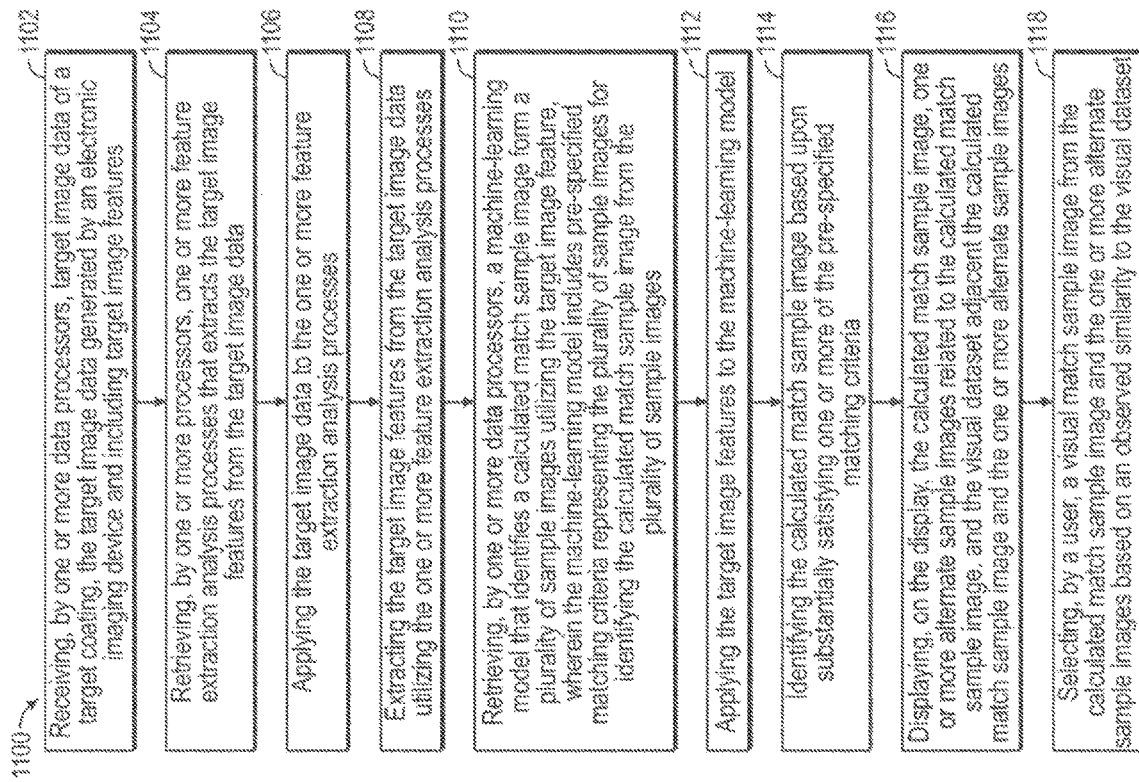
FIG. 8 is a flow chart illustrating a non-limiting embodiment of the system of FIG. 1.

A method 1100 for matching color and appearance of the target coating 12 is also provided herein with reference to FIG. 8 and continuing reference to FIGS. 1-7. The method 1100 includes the step 1102 of receiving, by one or more data processors, the target image data 18 of the target coating 12. The target image data 18 is generated by the electronic imaging device 16 and includes the target image features 26. The method 1100 further includes the step 1104 of retrieving, by one or more processors, one or more feature extraction analysis processes 28' that extracts the target image features 26 from the target image data 18. The method 1100 further includes the step 1106 of applying the target image features 26 to the one or more feature extraction analysis processes 28'. The method 1100 further includes the step 1108 of extracting the target image features 26 from the target image data 18 utilizing the one or more feature extraction analysis processes 28'.

The method 1100 further includes the step 1110 of retrieving, by one or more data processors, the machine-learning model 42 that identifies the calculated match sample image 44 from the plurality of sample images 32 utilizing the target image features 26. The machine-learning model 42 includes the pre-specified matching criteria 46 representing the plurality of sample images 32 for identifying the calculated match sample image 44 from the plurality of sample image 32. The method 1100 further includes the step 1112 of applying the target image features 26 to the machine-learning model 42. The method 1100 further includes the step 1114 of identifying the calculated match sample image 44 based upon substantially satisfying one or more of the pre-specified matching criteria 46.

In embodiments, the method 1100 further includes the step 1116 of displaying, on the display 52, the calculated match sample image 44, the one or more alternate match sample images 48 related to the calculated match sample image 44, and a target image 58 of the target coating 12 adjacent the calculated match sample image 44 and the one or more alternate match sample images 48. In embodiments, the method 1100 further includes the step 1118 of selecting, by the user, the visual match sample image 50 from the calculated match sample image 44 and the one or more alternate match sample images 48 based on the observed similarity to the target image data 18.

Figure 9:
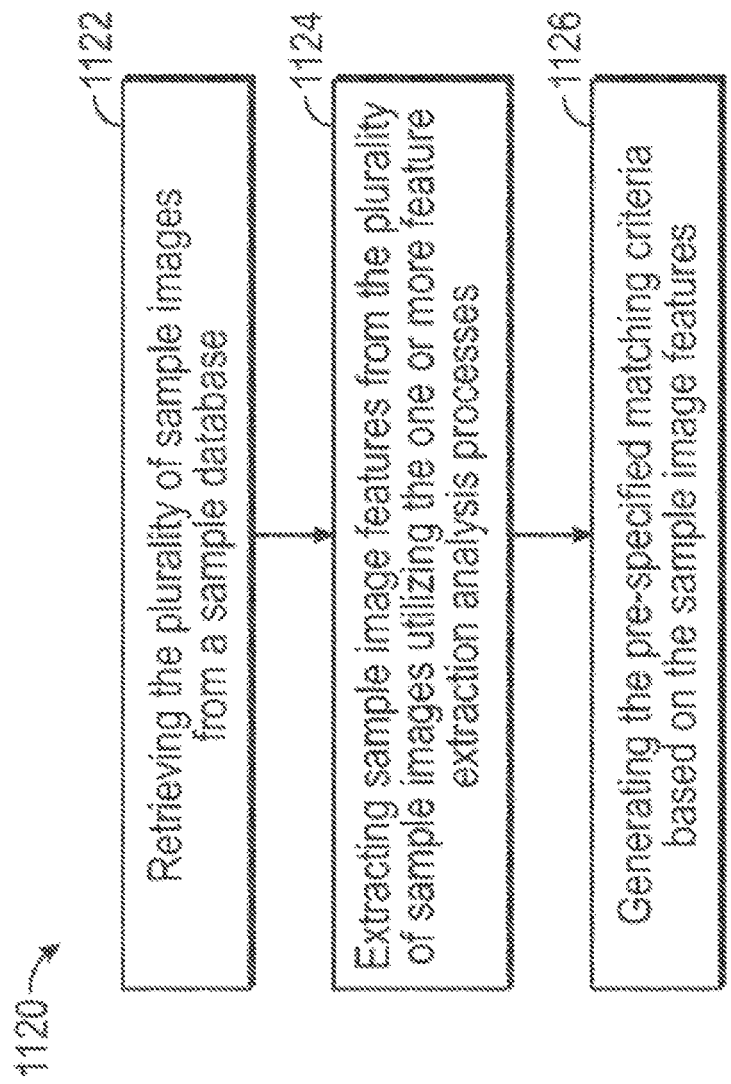
FIG. 9 is a flow chart illustrating a non-limiting embodiment of the method of FIG. 8.

With reference to FIG. 9 and continuing reference to FIGS. 1-8, in embodiments, the method 1100 further includes the step 1120 of generating the machine-learning model 42 based on the plurality of sample images 32. The step 1120 of generating the machine-learning model 42 may include the step 1122 of retrieving the plurality of sample images 32 from the sample database 30. The step 1120 of generating the machine-learning model 42 may further include the step 1124 of extracting the sample image features 40 from the plurality of sample images 32 based on one or more feature extraction analysis processes 28'. The step 1120 of generating the machine-learning model 42 may further include the step 1126 of generating the pre-specified matching criteria 46 based on the sample image features 40.

Figure 10:
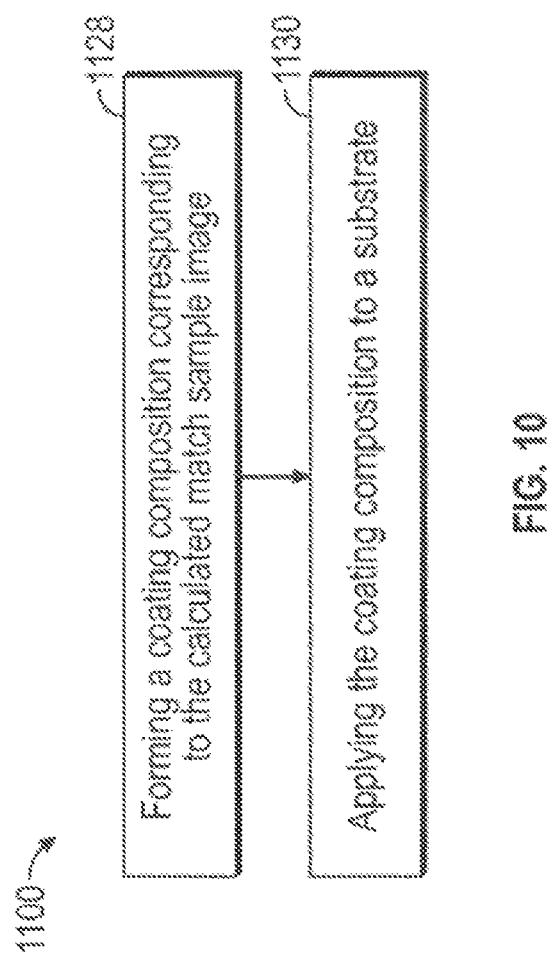
FIG. 10 is a flow chart illustrating another non-limiting embodiment of the method of FIG. 8.

With reference to FIG. 10 and continuing reference to FIGS. 1-9, in embodiments, the method 1100 further includes the step 1128 of forming a coating composition corresponding to the calculated match sample image 44. The method 1100 may further include the step 1130 of applying the coating composition to the substrate 14.

The method 1100 and the system 10 disclosed herein can be used for any coated article or substrate 14, including the target coating 12. Some examples of such coated articles can include, but not limited to, home appliances, such as refrigerator, washing machine, dishwasher, microwave ovens, cooking and baking ovens; electronic appliances, such as television sets, computers, electronic game sets, audio and video equipment; recreational equipment, such as bicycles, ski equipment, all-terrain vehicles; and home or office furniture, such as tables, file cabinets; water vessels or crafts, such as boats, yachts, or personal watercrafts (PWCs); aircrafts; buildings; structures, such as bridges; industrial equipment, such as cranes, heavy duty trucks, or earth movers; or ornamental articles.

Figure 11:
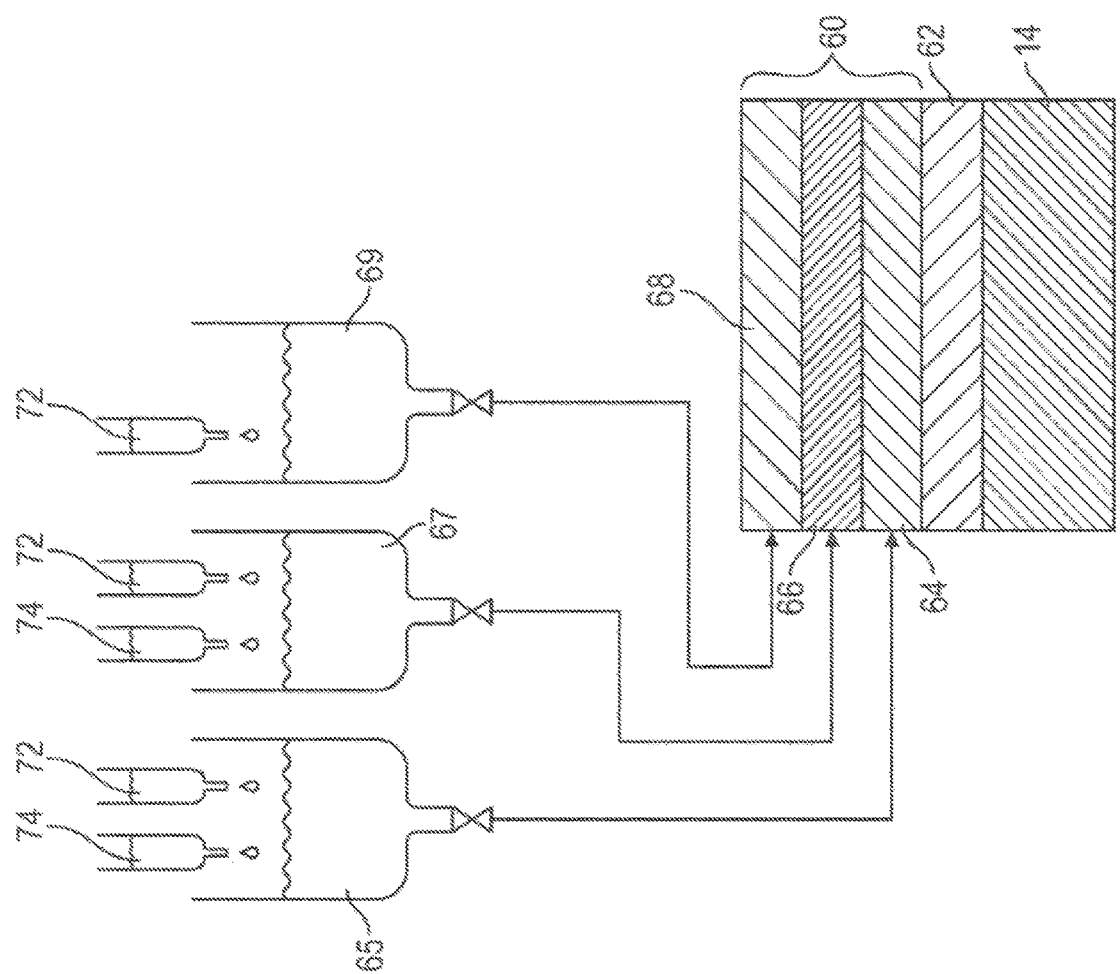
FIG. 11 is a schematic diagram illustrating formation of a cross sectional portion of a substrate and a coating.

Color matching for effect pigment-based coatings is particularly challenging. Effect coatings include metallic coatings and pearlescent coatings, but may also include other effects such as phosphorescence, fluorescent, etc. Metallic and pearlescent coatings include an effect additive 74, as illustrated in FIG. 11 with continuing reference to FIGS. 1-10. A coating, including a target coating 12 and/or a sample coating 60 as illustrated, may include several layers overlying the substrate 14. The target coating 12 described above may include the same layers as the sample coating 60 illustrated in FIG. 11, so the description of the layers of the sample coating 60 also applies to the target coating 12 described above. As used herein, the term "overlying" means "over" such that an intervening layer may lie between the overlying component (the sample coating 60 in this example) and the underlying component (the substrate 14 in this example,) or "on" such that the overlying component physically contacts the underlying component. Moreover, the term "overlying" means a vertical line passing through the overlying component also passes through the underlying component, such that at least a portion of the overlying component is directly over at least a portion of the underlying component. It is understood that the substrate 14 may be moved such that the relative "up" and "down" positions change. Spatially relative terms, such as "top", "bottom", "over" and "under" are made in the context of the orientation of the cross-sectional FIG. 11. It is to be understood that spatially relative terms refer to the orientation in FIG. 11, so if the substrate 14 were to be oriented in another manner the spatially relative terms would still refer to the orientation depicted in FIG. 11. Thus, the terms "over" and "under" remain the same even if the substrate 14 is twisted, flipped, or otherwise oriented other than as depicted in the figures.

FIG. 11 illustrates a primer 62 overlying the substrate 14, and a base coat 64 overlying the primer 62. The primer 62 and substrate 14 are not considered part of the sample coating 60 in this description. An optional effect coat 66 overlies the base coat 64, and a clear coat 68 overlies the optional effect coat 66. A sample coating formula 70 includes a plurality of components 72, where the components 72 for the base coat 64 may not be the same as the components 72 for the optional effect coat 66 and/or the clear coat 68. One or both of the base coat 64 and the effect coat 66 include an effect additive 74 as one of the components 72. The effect additive 74 is utilized for producing the special effect of the sample coating 60, such as producing a metallized or pearlescent effect. The sample coating formula 70 includes a base coat formula 65 for the base coat 64, an optional effect coat formula 67 for the optional effect coat 66, and a clear coat formula 69 for the clear coat 68. The sample coating formula 70 may include formulas for other optional layers as well in some embodiments.

A metallic effect is produced when the sample coating 60 (or any other coating) includes reflective flakes that are visible. The reflective flakes serve as the effect additive 74. In an embodiment, metal particles in the paint pick up and reflect more incident light than the basic paint colors, giving a coating a varied appearance over a given area. Some of the coating will appear as the color of the base coat, and other portions will reflect light and appear as a sparkle or glimmer. The metallic color is a color that appears to be that of a polished metal. The visual sensation usually associated with metals is a metallic shine that is different than a simple solid color. The metallic color includes a shiny effect that is due to the material's brightness, and that brightness varies with the surface angle relative to a light source. One technique utilized to produce a metallic effect color is to add aluminum flakes (which are an example of an effect additive 74) to a pigmented coating. The aluminum flakes produce a sparkle that varies in size, brightness, and sometimes in color depending on how the flakes are processed. Larger flakes produce a coarser sparkle, and smaller flakes produce a finer sparkle. Different types of flakes may be utilized, such as "silver dollar" flakes that are flat and relatively circular, like a silver dollar coin. Other types of flakes may have jagged edges, like a corn flake. The flakes may also be colored in some embodiments, so the flake produces a colored sparkle.

Adding the aluminum flakes to the base coat 64 produces a metallic effect, but if the same type and amount of flakes are added to a translucent effect coat 66 that overlies the base coat 64, the coating has a different appearance that is "deeper." In another embodiment, the base coat 64 may include one type and amount of effect additive 74, and the effect coat 66 may include a different type and/or amount of effect additive 74 to produce yet another appearance. Therefore, many variables can influence the appearance of the metallic color, such as the type of flake, the size of the flake, the coat that includes the flake, the base color, etc. Therefore, it is difficult to match a metallic effect because of the wide variety of factors and appearances that are possible.

A pearlescent coating includes an effect additive 74 that selectively reflects, absorbs, and/or transmits visible light, which can result in a colorful appearance that varies based on the flake's structure and morphology. This gives the coating a sparkle as well as a deep color that changes with viewing angle and/or lighting angle. The effect additive 74 in a pearlescent coating may be ceramic crystals, and these effect additives 74 may be added to the base coat 64, the effect coat 66, or both. Furthermore, the pearlescent effect additive 74 may be of varying grades with different sizes, refractive indices, shapes, etc., and the different grades may be used alone or in combination. It is also possible to combine a pearlescent effect additive 74 with a metallic effect additive 74, in a wide variety of combinations, and the appearance of the coating will vary with changes in the effect additive concentration, type, positioning, etc. All the different possible variations in the effect additive 74 may apply to a single color, so a technique that matches just the color will not be effective at reproducing the appearance of the effect pigment-based coating.

As mentioned above, the effect pigment-based coating has a varying appearance, so different pixels within an image will have different colors, brightness, hue, chroma, or other appearance features, as seen in the illustrations in FIGS. 3A, 4A, and 5A. Because of this, a color matching protocol that breaks the image into pixels, and then analyzes the image pixel by pixel to determine a pixel difference between two or more pixels, can aid in matching the overall appearance of an effect pigment-based coating. A mathematical model, such as the machine learning model described above, can be utilized to determine features of an image based on differences between pixels within an image. As such, a target image 58 can be analyzed pixel by pixel with a mathematical model to produce a target image feature 26, as mentioned above, and this may be combined with other target image features 26 such as color (which may be determined for the target image 58 as a whole instead of a pixel by pixel determination) or other target image features. The resulting one or more target image features 26 may be compared to a sample database 30 that has produced similar sample image features 40 to find the best match, again as described above. The pixel-by-pixel evaluation can produce a match for effect pigments that is not possible with evaluations based on a target image 58 as a whole.

Figure 12:
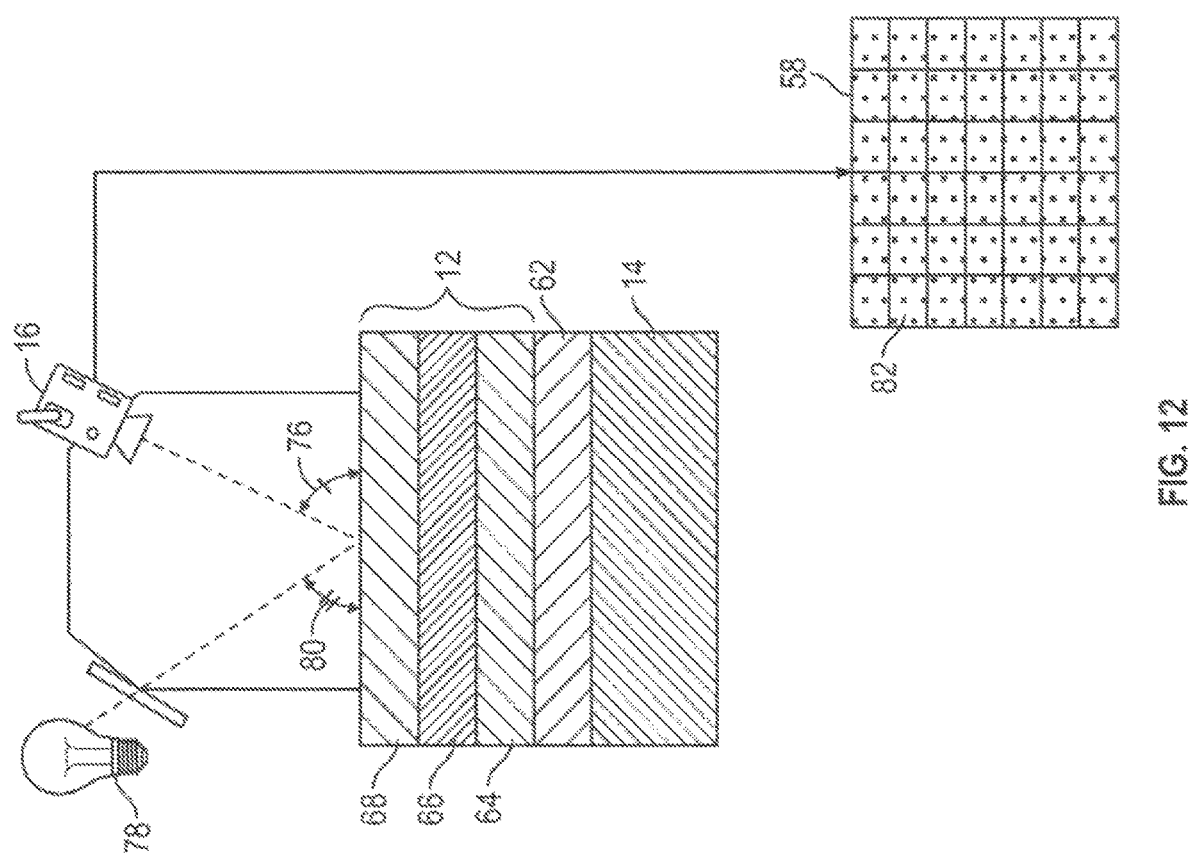
FIGS. 12 and 13 are schematic diagrams illustrating capturing an image of a coating.

Reference is made to an embodiment illustrated in FIG. 12, with continuing reference to FIGS. 1-11. An imaging device 16 captures a target image 58 of a target coating 12, as described above. The imaging device 16 is set at an imaging angle 76 relative to a surface of the target coating 12, and an illumination source 78 is set at an illumination angle 80 during capture of the target image 58. The target image 58 is divided into a plurality of target pixels 82, where the plurality of target pixels 82 vary such that at least one target pixel 82 is different than another target pixel 82 in appearance.

Figure 13:
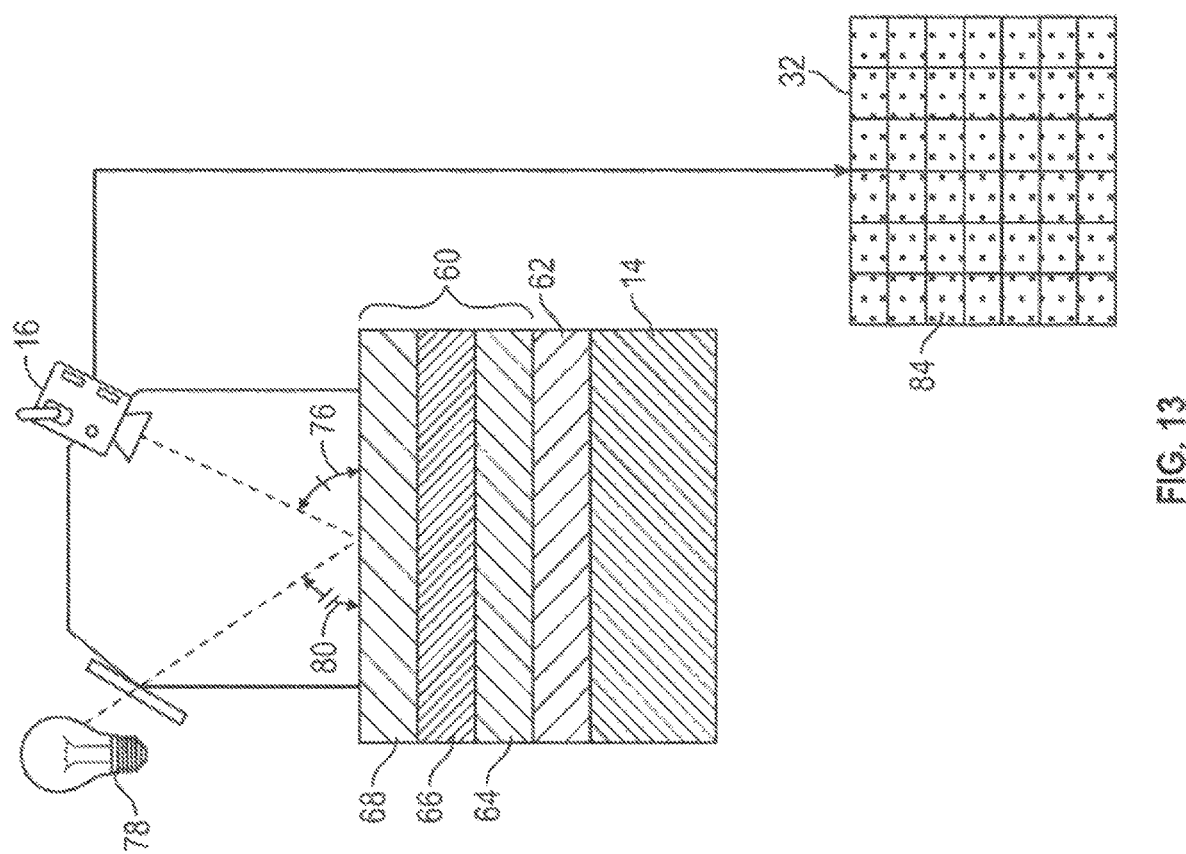

In a similar manner, with reference to an embodiment illustrated in FIG. 13 with continuing reference to FIGS. 1-12, the image device 16 captures a sample image 32 of a sample coating 60, again as described above. The image device 16 used to capture the sample image 32 may be the same as the image device 16 used to capture the target image 58, but different imaging devices 16 may also be utilized. An illumination source 78 is also utilized for capturing the sample image 32, where the imaging device is set at the imaging angle 76 relative to a surface of the sample coating 60 and the illumination source 78 is set at the illumination angle 80, similar to as described for the target image 58 in FIG. 12. The sample image 32 is divided into a plurality of sample pixels 84, where one sample pixel 84 has a different appearance than another sample pixel 84. In an embodiment, the sample coating 60 includes an effect additive 74, which is illustrated in the illustration of the sample image 32 with small dots, and which produces variations in the appearance of the sample pixels 84 within the sample image 32. The target and sample coatings 12, 60 in FIGS. 12 and 13, respectively, may include a base coat 64, an optional effect coat 66, and a clear coat 68, but variations in the coats that are present are also possible.

Figure 14:
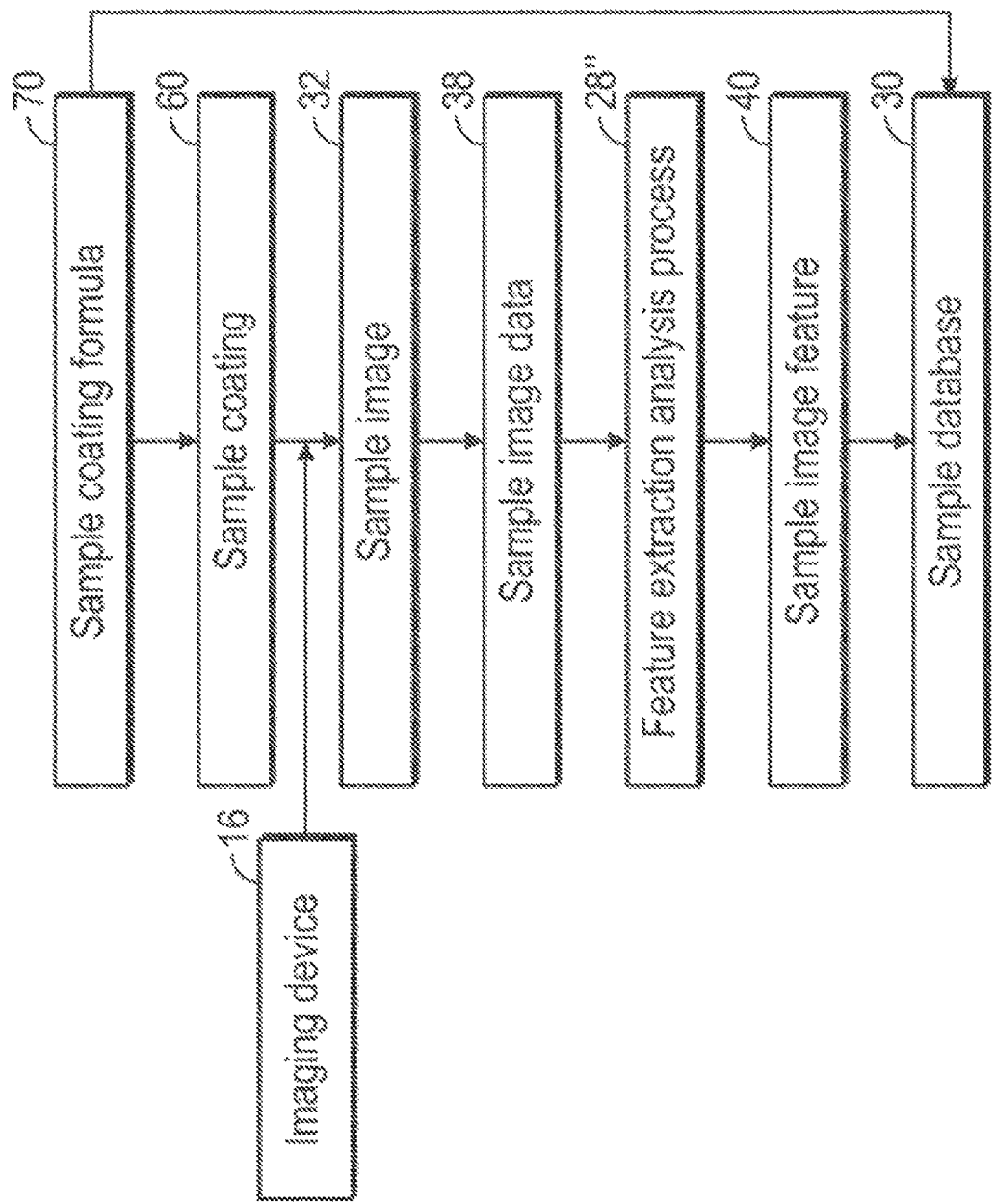
FIGS. 14 and 15 are flow charts illustrating an embodiment of a system and method.

A sample database 30 is produced for matching a target image 58 with a sample coating formula 70, as illustrated in an embodiment in FIG. 14 with continuing reference to FIGS. 1-13. Production of the sample database 30 includes producing a sample coating formula 70, where the sample coating formula 70 includes an effect additive 74. The sample coating formula 70 may include a base coat 64 and a clear coat 68, or a base coat 64, an effect coat 66, and a clear coat 68, but other embodiments are also possible. For example, any one of the base coat 64, optional effect coat 66, and clear coat 68 may include a plurality of layers, and other coating layers may also be present.

Once the sample coating formula 70 is produced, a sample coating 60 is produced with the sample coating formula 70. This is typically done by applying the material from the sample coating formula 70 onto a substrate 14, such as by spray painting, applying with a brush, dip coating, digital printing, or any other coating technique. In an embodiment, the sample coating 60 is formed by spray painting, where the spray painting utilizes recommended spray painting conditions for the grade of coating in the sample coating formula 70. The spray painting conditions may include the type of solvent, the quantity of solvent, the spray gun pressure, the type and/or size of spray gun nozzle used, the distance between the spray gun and the substrate 14, etc. Producing the sample coating 60 using the same technique typically utilized by auto body repair shops or others that may need to match a target coating 12 may provide a more accurate representation of the finished product that can be expected than if the sample coating 60 were applied with another technique. The sample coating formula 70 included one or more effect additives 74, so the sample coating 60 has a varied appearance where one portion of the sample coating 60 appears different than another portion. For example, a sparkle appears different than a matte color.

A sample image 32 is then produced with an imaging device 16, such as by photographing the sample coating 60. The sample image 32 includes a plurality of sample image data 38, such as RGB values, L*a*b* values, etc. The sample image 32 may be one or more still images, or a moving image. In an embodiment, the sample image 32 includes a plurality of still images captured with known and specified illumination, imaging angles, distance between the imaging device 16 and the sample coating 60, and illumination angles. The sample image 32 may also be directed to an essentially flat portion of the sample coating 60, but in some embodiments the sample image may also include one or more images of a sample coating 60 with a known curvature.

A feature extraction analysis process 28″ may be applied to the sample image data 38 to produce a sample image feature 40. The sample image feature 40 and the sample coating formula 70 are then linked together and saved in the sample database 30. The sample database 30 may include a plurality of sample image features 40 linked to one sample coating formula 70, and one or more sample images 32 may also be linked with the sample coating formula 70. The sample database 30 is saved in one or more storage devices 22, which may be the same or different than the storage device(s) 22 mentioned above for matching the target coating 12. The storage device 22 that saves the sample database 30 may be associated with a data processor 24, as described above, to execute instructions for saving and retrieving data from the sample database 30. The process illustrated in FIG. 14 may be repeated for a wide variety of sample coating formulas 70, so a plurality of sample coating formulas 70 are saved in the sample database 30. The sample coating formulas 70 may also be configured to about match original equipment coatings provided by vehicle manufacturers, with the intent to match vehicle coatings with a sample coating formula 70. One or more of the sample image(s) 32 may be utilized as the calculated match sample image 44, or a different set of parameters may be utilized to capture the calculated match sample image 44 from the sample coating 60.

A plurality of sample coating formulas 70 that produce about the same sample image 32 may be produced, where the sample coating formulas 70 are different from each other and include different grades of a coating. Some vehicle repair shops tend to utilize one grade of coating, and the grade of coating may vary from one vehicle repair shop to the next. A sample database 30 that includes a matching sample coating formula 70 that utilizes the same grade of coating that the vehicle repair shop is familiar with may improve the results because of the skill and familiarity the vehicle repair shop has with a particular grade of coating. In this manner, the same sample database 30 can be utilized by different vehicle repair shops (or other users of the sample database 30) that typically use different grades of a coating.

Figure 15:
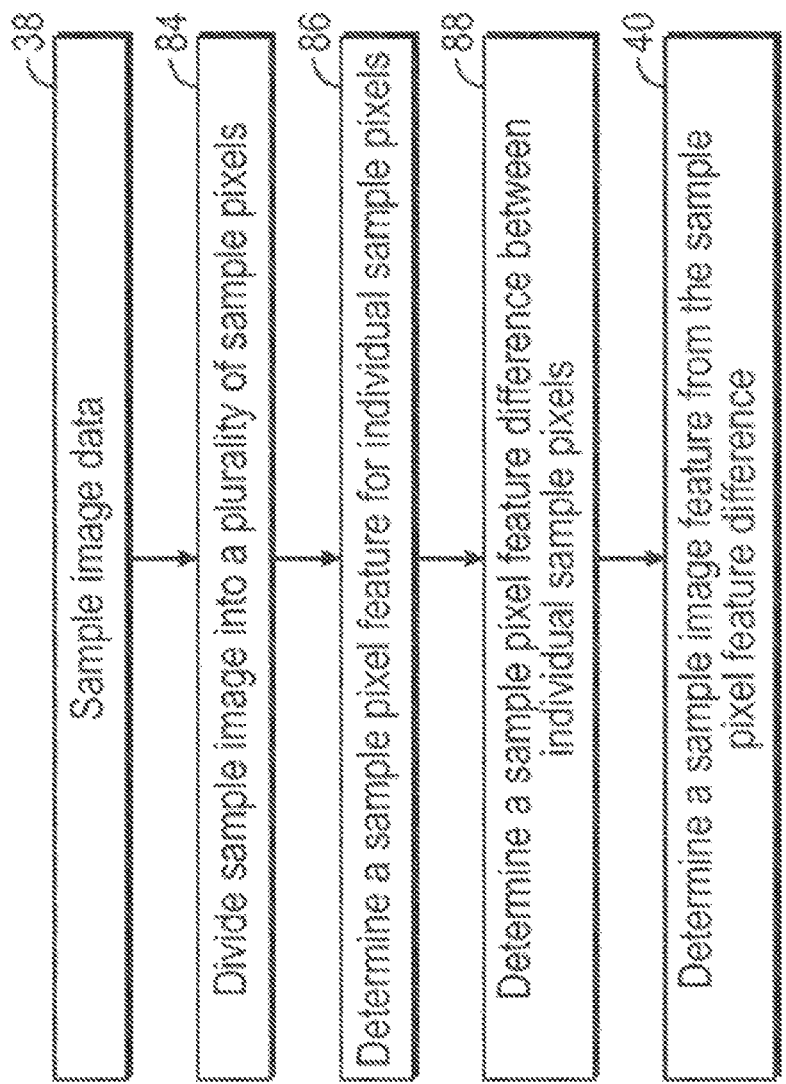

The feature extraction analysis process 28" described above for FIG. 14 is shown in greater detail in an embodiment in FIG. 15, with continuing reference to FIGS. 1-14. The sample image 32 is divided into a plurality of sample pixels 84. Each sample pixel 84 has sample pixel image data, and the sample pixel image data is utilized to determine a sample pixel feature 86 for the sample pixel 84. The sample pixel feature 86 may be different than an overall sample feature 40, because the sample pixel 84 may have a different appearance than the overall sample image 32. The sample pixel feature 86 may be a determination of the RGB values for that sample pixel 84, or the L*a*b* values for that sample pixel 84, or other appearance attributes for that sample pixel 84. In an embodiment, a sample pixel feature 86 is determined for all of the sample pixels 84 of the sample image 32, but a sample pixel feature 86 may be determined for only a subset of the sample pixels 84 of the sample image 32 in alternate embodiments. In all embodiments, a sample pixel feature 86 is determined for a plurality of the sample pixels 84, where that sample pixel feature 86 varies for at least some of the sample pixels 84. A sample pixel feature difference 88 is then determined for the sample pixels 84. The sample image feature 40 is then determined from the sample pixel feature difference 88.

An embodiment is illustrated in FIG. 16, with continuing reference to FIGS. 1-15, where a three-dimensional coordinate system 90 is utilized. The three-dimensional coordinate system 90 may represent the RGB color system, where one axis of the three-dimensional coordinate system 90 is the R value, another axis is the G value, and the third axis is the B value. Alternatively, the three-dimensional coordinate system 90 may represent the L*a*b* color system, where one axis is the L* value, another axis is the a* value, and the third axis is the b* value. The three-dimensional coordinate system 90 may represent other axis in alternate embodiments, and in some embodiments a three-dimensional coordinate system 90 may not be utilized. The sample pixel features 86 may then be plotted in the three-dimensional coordinate system 90, and the number of sample pixels 84 that fall within each block of the three-dimensional coordinate system 90 may be tallied. In the hypothetical illustration in FIG. 16, the first block nearest the 0-0-0 coordinate has a tally of 1, the block directly above it has a tally of 2, and the block directly above that has a tally of 5. Alternate techniques may be utilized to determine the sample pixel feature difference 88, and a plurality of techniques may be utilized to determine a plurality of sample pixel feature differences 88 for one sample image 32 in a variety of manners.

A sample image feature 40 may then be determined from the sample pixel feature differences 88, as illustrated in FIG. 15 with continuing reference to FIGS. 1-14 and FIG. 16. Determining a sample image feature 40 from a plurality of sample pixel feature differences 88 is referred to herein as a spatial micro-color analysis, because the sample image feature 40 is based on color or appearance changes in difference spaces within a sample image 32. There may be plurality of sample image features 40 determined for one single sample image 32, and some of those sample image features 40 may be based on spatial micro-color analysis, and others may not. However, in this description, at least one of the sample image features 40 is based on spatial micro-color analysis. As such, the sample database 30 includes at least one sample image feature 40 that is based on spatial micro-color analysis. The sample image data 38 block at the top of FIG. 15 and the sample image feature 40 block at the bottom of FIG. 15 show an embodiment of the steps utilized between the comparably labeled blocks in FIG. 14. A calculated match sample image 44 may also be saved in the sample database 30, where the calculated match sample image 44 may be utilized for display to a user as described above. The user can then determine whether the calculated match sample image 44 is an acceptable match for the target coating 12 based on a visual analysis. The calculated match sample image 44 may be captured with the imaging device 16 under conditions that render the calculated match sample image 44 acceptable for visual analysis.

Figure 17:
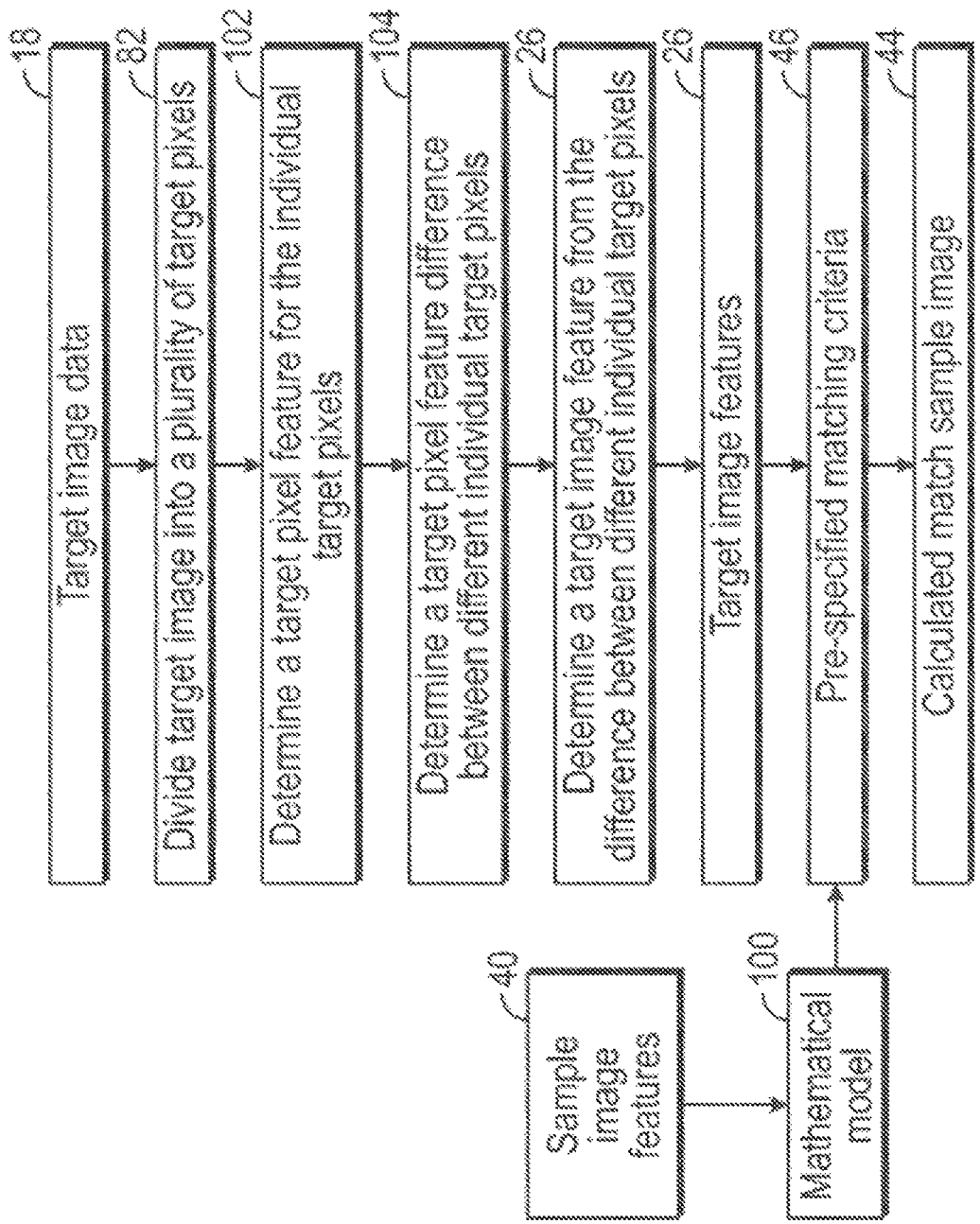
FIGS. 17-19 are flow charts illustrating embodiments of methods.

Reference is made to an embodiment illustrated in FIG. 17, with continuing reference to FIGS. 1-16. FIG. 17 illustrates an embodiment for utilizing spatial micro-color analysis on the target image 58, as exemplified in the feature extraction analysis process 28' block in FIG. 2. As such, the target image data 18 block at the top of FIG. 17 and the target image feature 26 block third from the bottom of FIG. 16 are taken from the comparably named blocks in FIG. 2. FIG. 17 also illustrates an embodiment where the mathematical model 100 utilized to compare the target image feature 26 with the sample image feature 40 is something other than a machine learning model 42. However, it is to be understood that a machine learning model 42 may still be utilized in some embodiments. The sample image features 40 illustrated in FIGS. 2 and 17 are derived from the sample database 30, as described above.

The target image 58 is divided into a plurality of target pixels 82, as illustrated in FIG. 12 and FIG. 17. Each target pixel 82 includes a target pixel image data, where the target pixel image data is at least a part of the target image data 18. A target pixel feature 102 is determined from the target pixels 82, where each of the target pixels 82 has at least some of the target image data 18 and at least some of that target image data 18 for the different target pixels 82 varies, as described above for the sample pixel features 86. A target pixel feature difference 104 is then determined from the target pixel features 102, and a target image feature 26 is then determined from the target pixel feature differences 104, again as described above for the sample pixel feature 86. As such, because at least some of the target pixels 82 have different target image data 18, at least one of the target image features 26 is determined by spatial micro-color analysis. The target image features 26 for a single target image 58 may include one or more target image features 26 that are determined by spatial micro-color analysis, and may also include one or more target image features 26 that are not based on spatial micro-color analysis. Pre-specified matching criteria 46 are then utilized to determine a calculated match sample image 44, as described above.

A wide variety of spatial micro-color analysis mathematical techniques may be utilized to determine the target image feature 26 and/or the sample image feature 40, and the same techniques may be utilized in some embodiments to facilitate matching. A partial listing of spatial micro-color analysis mathematical techniques is listed below, where the generic terms pixel means either a target or sample pixel 82, 84; and image means either a target or sample image 58, 32. Examples of spatial micro-color analysis mathematical techniques include, but are not limited to: determining L*a*b* color coordinates of individual pixels of the image; determining average L*a*b* color coordinates from individual pixels for a total image of the image; determining sparkle area of a black and white image of the image; determining sparkle intensity of the black and white image of the image; determining sparkle grade of the black and white image of the image; determining sparkle color of the image; determining sparkle clustering of the image; determining sparkle color differences within the image; determining sparkle persistence of the image, where sparkle persistence is a measure of the sparkle as a function of one or more illumination changes during capture of the image; determining color constancy, at a pixel level, with one or more illumination changes during capture of the image; determining wavelet coefficients of the image at the pixel level; determining Fourier coefficients of the target image at the target pixel level; determining average color of local areas within the image, where the local area may be one or more pixels, but where the local area is less than a total area of the image; determining pixel count in discrete L*a*b* ranges of the image, where the L*a*b* range may be fixed or may be data driven such that the range varies; determining maximally populated coordinates of cubic bins at the pixel level of the image, where the cubic bins are based on a 3 dimensional coordinate mapping using L*a*b* or RGB values; determining overall image color entropy of the image; determining image entropy of one or more of the L*a*b* planes as a function of the 3rd dimension of the image; determining image entropy of one or more of the RGB planes as a function of the 3rd dimension of the image; determining local pixel variation metrics of the image; determining coarseness of the image; determining vectors of high variance of the image, where the vectors of high variance are established using principle component analysis; and determining vectors of high kurtosis of the image, where the vectors of high kurtosis are established using independent component analysis.

Determining L*a*b* color coordinates of individual pixels of the target/sample image includes breaking the image into pixels, and then determining the L*a*b* color coordinates for a plurality (or all in some embodiments) of the pixels. Determining average L*a*b* color coordinates from individual pixels for a total image of the image means averaging the L*a*b* samples for each of the pixels within the image. Determining sparkle area of a black and white image of the image means rendering or obtaining the image in black and white, and then determining how many pixels include a sparkle and a total number of the pixels within a given area. The given area may be the entire image, or a subset of the image. The sparkle area is then determined by dividing the number of pixels in the given area that include a sparkle by the total number of the pixels in that given area. Determining sparkle intensity of the black and white image of the image means determining the average brightness of the pixels that include a sparkle within a given area.

Determining sparkle grade of the black and white image means determining a value derived from the sparkle area and sparkle intensity that describes the visual perception of the sparkle phenomena. Determining sparkle color of the image means determining the location of a sparkle, and then determining the color of that sparkle. Determining sparkle clustering of the image means determining the various colors of sparkle that are present in an image using clustering or distribution fitting algorithms. Determining sparkle color differences within the image means determining the color of the sparkles in the image, as mentioned above, and then determining the variation or differences in that color in the sparkles. Determining sparkle persistence of the image means determining if a sparkle remains within a given pixel (and if the sparkle has a change in brightness) when the illumination changes during capture of the image, and where the imaging angle 76 and the illumination angle 80 remain the same. Determining color constancy, at a pixel level, means determining if a color of a pixel remains the same within a given pixel when the illumination changes during capture of the image, and where the imaging angle 76 and the illumination angle 80 remain the same. At least two different images are needed to determine sparkle persistence and color constancy.

Determining the Fourier coefficients of the image at the pixel level means determining coefficients associated with the image after decomposing the image into sinusoid components of different frequency using the Fourier transform, where the coefficients describe the frequencies present in the image. This can be determined for a given number of pixels within a given area of the image. Determining wavelet coefficients of the image at the pixel level means determining the coefficients associated with the image after decomposing the image into components associated with shifted and scaled versions of a wavelet using the discrete or continuous wavelet transform, where the coefficients describe the image content associated with the relevantly shifted and scaled version of the wavelet. A wavelet is a function that tends towards zero at the extrema with a local area containing an oscillation. This can be determined for a given number of pixels within a given area of the image. Determining average color of local areas within the image means determining the average color of one or more pixels within a sample area that is less than the total area of the image. Determining the pixel count in discrete L*a*b* ranges of the image means determining the pixel count within a given area of a three-dimensional coordinate system 90 using the L*a*b* values as the axes, similar to the illustration in FIG. 16. The size of the given area within the three-dimensional coordinate system 90 may be fixed, or the size may vary depending on the count values generated. Determining maximally populated coordinates of cubic bins at the pixel level of the image, where the cubic bins are based on a three-dimensional coordinate system 90 using L*a*b* or RGB values as the axes, means determining the blocks with the highest pixel counts as illustrated in FIG. 16. Set values, percentage values, or other metrics may be used to determine the value that designates a block as being "maximally" populated.

Determining overall image color entropy of the image means determining the overall color entropy of the image based on variations within the pixels. Color entropy may be Shannon entropy or other types of entropy calculations. Determining image entropy of one or more of the L*a*b* planes or RGB planes as a function of the 3rd dimension of the image means selecting a plane within the three-dimensional coordinate system 90 as illustrated in FIG. 16, and then determining the entropy based on the values along that plane. The entropy can be Shannon entropy or other types of entropy calculations, as mentioned above. Determining local pixel variation metrics of the image means selecting essentially any pixel feature and then determining the variation of that pixel feature within the image. Determining coarseness of the image means determining the impression of coarseness of an image based on shadowing or other features that suggest coarseness. Determining vectors of high variance of the image means determining vectors based on a vector origin at a coordinate origin, where the vectors of high variance are established using principle component analysis. The vectors of high variance can be considered target or sample image features 26, 40, or pixel data from the image can be projected onto the vectors to derive new target or sample image features 26, 40. Determining vectors of high kurtosis of the image again means determining vectors based on a vector origin at the coordinate origin, where the vectors of high kurtosis are established using independent component analysis. The vectors of high kurtosis can be considered target or sample image features 26, 40, or pixel data from the image can be projected onto the vectors to derive new target or sample image features 26, 40.

Figure 18:
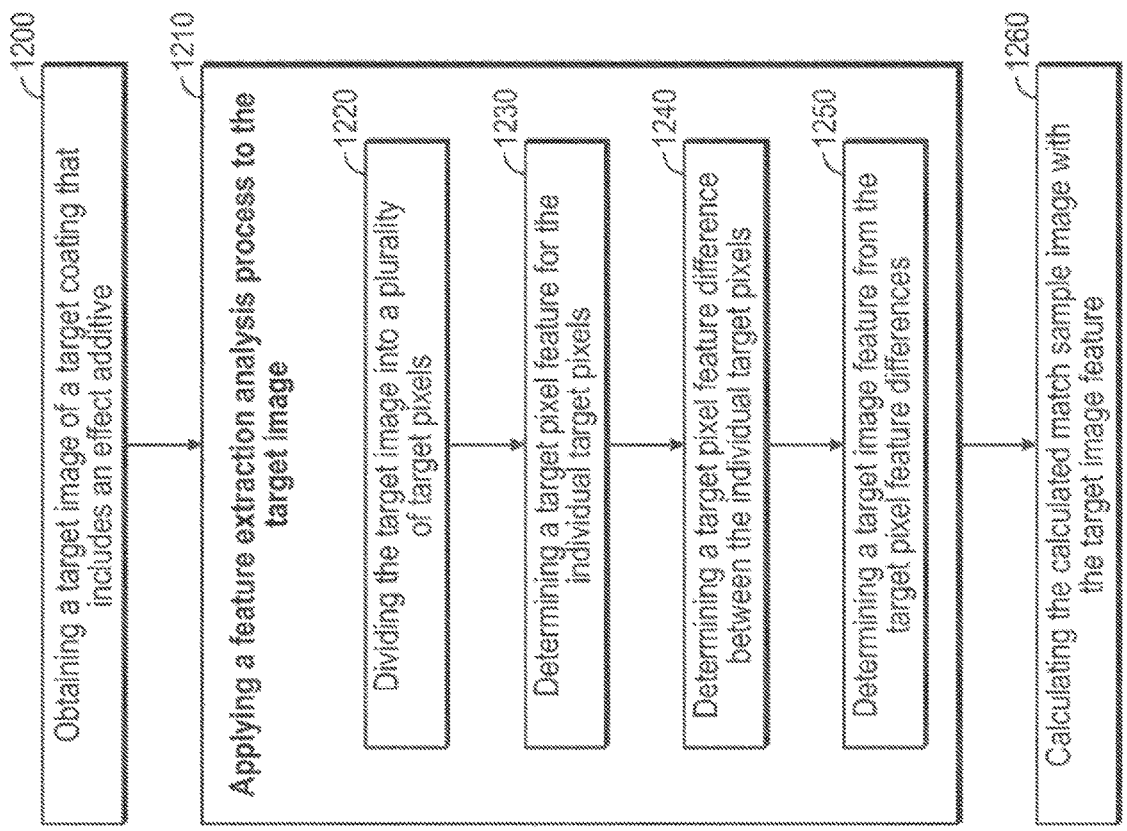

A method of matching a target coating 12 is provided in another embodiment, as illustrated in FIG. 18 with continuing reference to FIGS. 1-17. The method includes obtaining 1200 a target image 58 of a target coating 12, where the target coating 12 is an effect pigment-based coating that includes an effect additive 74. The method further includes applying 1210 a feature extraction analysis process 28' to the target image 58, where the feature extraction analysis process 28' includes dividing 1220 the target image 58 into a plurality of target pixels 82 that include target pixel image data; determining 1230 a target pixel feature 102 for the individual target pixels of the plurality of target pixels 82; determining 1240 a target pixel feature difference 104 between the individual target pixels 82; determining 1250 a target image feature 26 from the target pixel feature difference 104; and calculating 1260 the calculated match sample image 44 with the target image feature 26 based upon substantially satisfying one or more pre-specified matching criteria.

Figure 19:
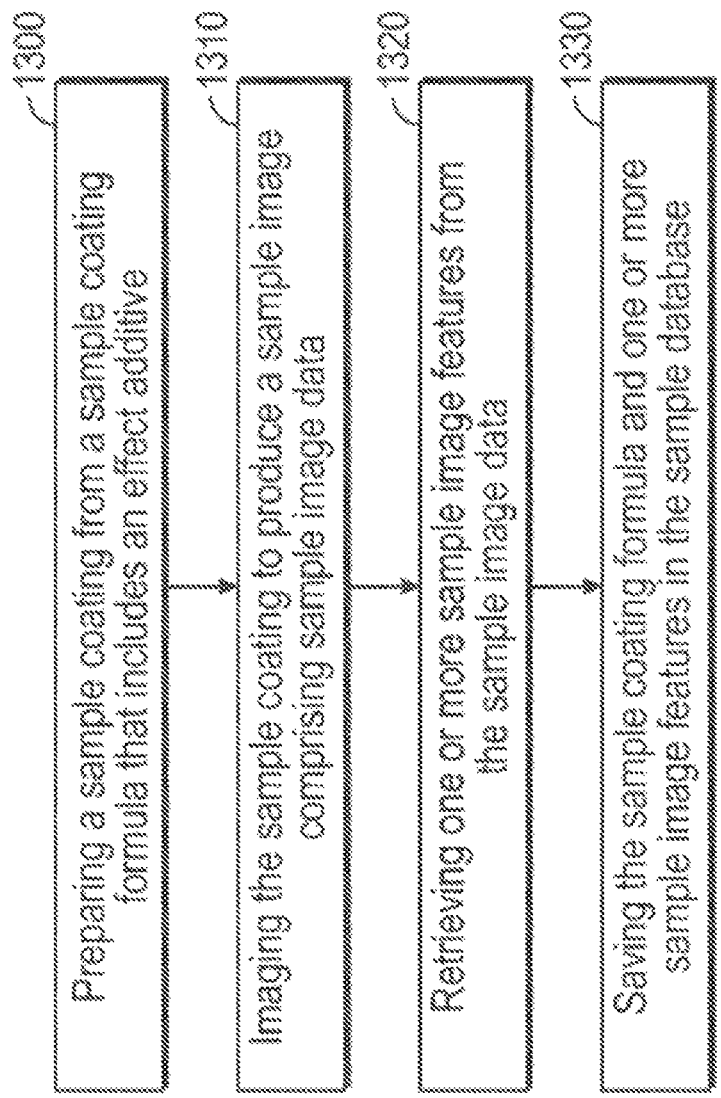

A method of producing a sample database 30 is also provided, as illustrated in FIG. 19 with continuing reference to FIGS. 1-18. The method includes 1300 preparing a sample coating 60 from a sample coating formula 70 that includes an effective additive 74 such that the appearance of the sample coating 60 varies from one location to another. The method also includes imaging 1310 the sample coating to produce a sample image 32 that comprises sample image data, where the sample image 32 is divided into a plurality of sample pixels 84 that each comprise sample pixel image data. The next step is retrieving 1320 one or more sample image features 40 from the sample image data, where at least one of the sample image features 40 comprises a spatial micro-color analysis that includes a value determined by a sample pixel feature difference 88 between at least two of the sample pixels 84. Another step is saving 1330 the sample coating formula 70 and one or more sample image features 40 in the sample database 30, where the sample coating formula 70 is linked to the one or more sample image features 40.

Figure 20:
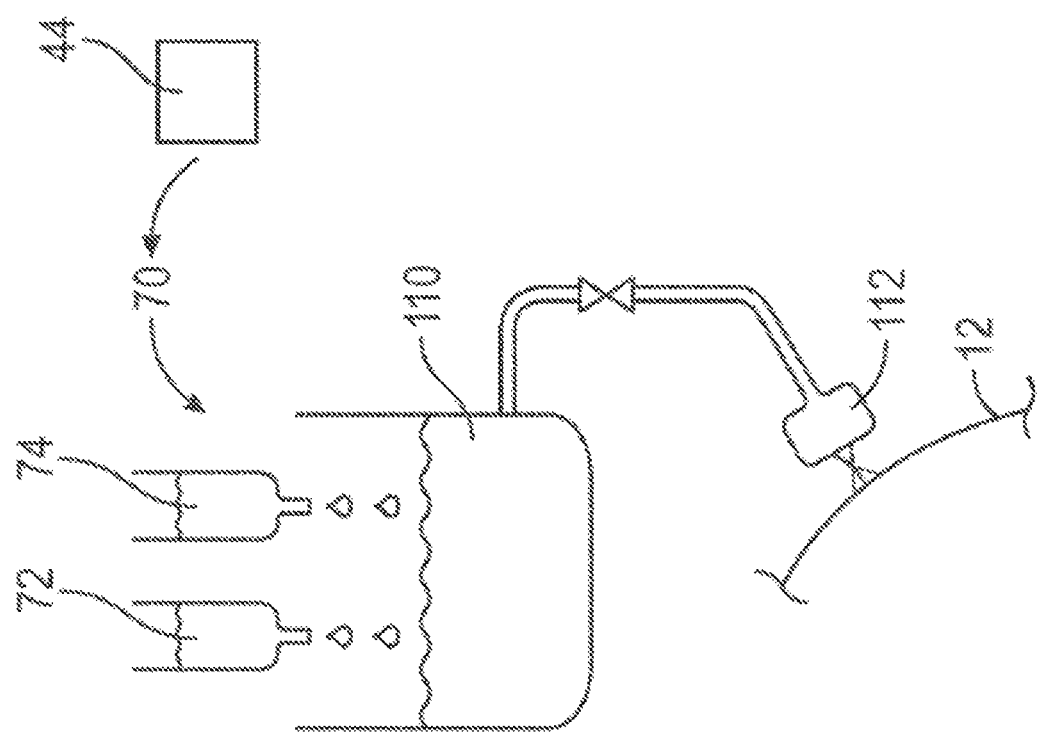
FIG. 20 is a schematic diagram illustrating application of a repair coating to a substrate.

Reference is made to FIG. 20. Once the calculated match sample image 44 is obtained, it may be approved by an operator. At that time, a repair coating 110 may be prepared using the sample coating formula 70 that corresponds to the calculated match sample image 44. In an exemplary embodiment, the sample coating formula 70 includes an effect additive 74 and one or more other components 72. The repair coating 110 may be applied to a substrate 14, such as a vehicle needing repairs, using one or more of a wide variety of techniques. In an exemplary embodiment, the repair coating 110 is applied to the substrate 12 utilizing digital printer 112 and a digital printing technique, as illustrated, but in alternate embodiments the repair coating 110 may be applied to the substrate 12 by other techniques including, but not limited to, spray painting, applying with a brush, and/or dip coating.

Figure 21:
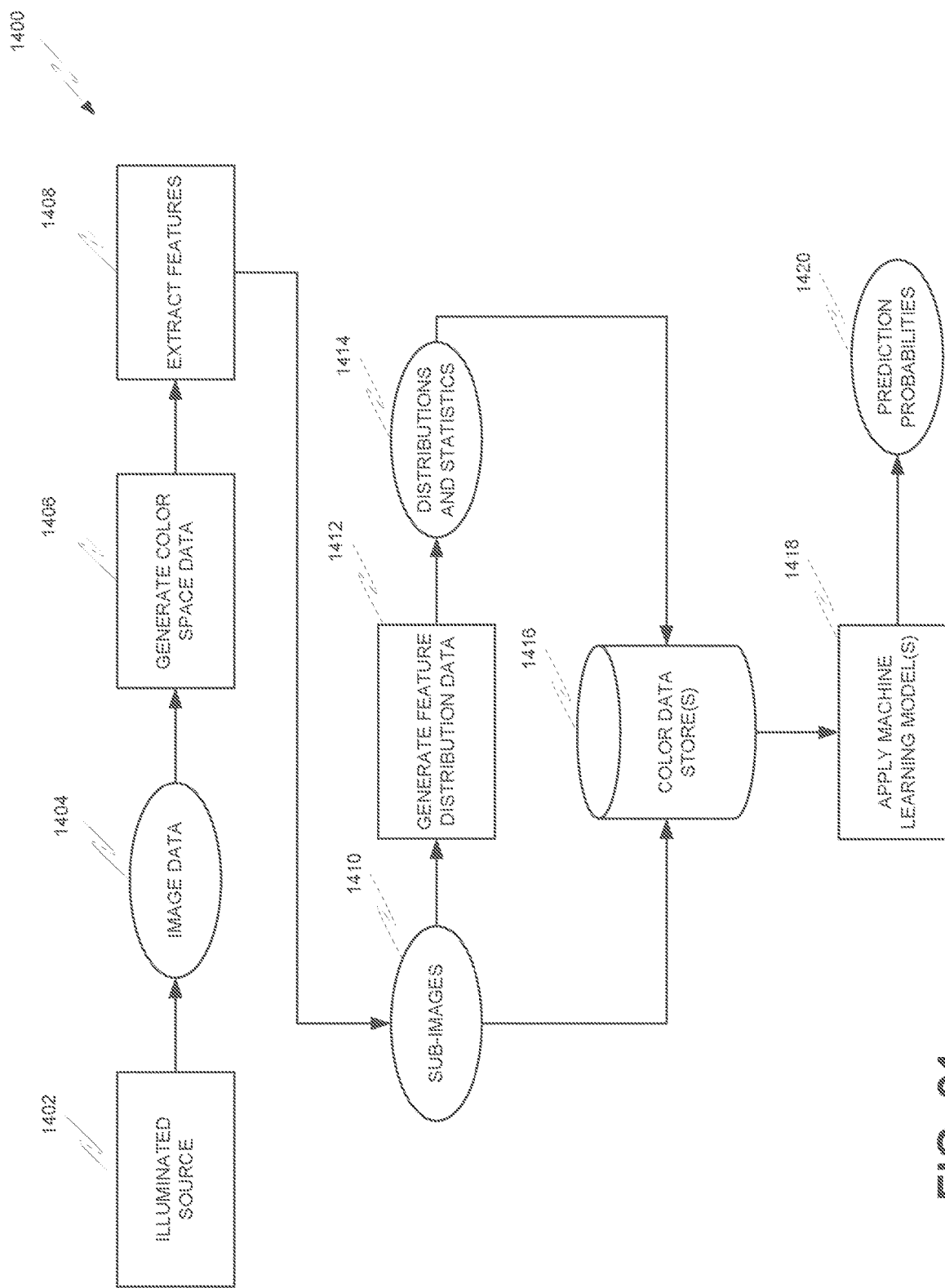
FIGS. 21-23 depict color matching analysis systems for analyzing one or more features of a target coating.

FIG. 21 depicts at 1400 an approach for analysis of one or more features of a painted automotive component or entire vehicle. An example of the type of analysis includes determining the type of pigment flake used on the painted object and using the analysis for matching purposes. The pigment flake selection process could be an automated part of a paint matching formulation development workflow, such as for effect pigments. This is in contrast to previous approaches which have used a manual process to identify potential effect pigments for matching purposes.

Image data 1404 of the painted object is provided to the analysis process. An electronic imaging device with inherent or supplemental illumination 1402 can generate image data 1404 of the target coating of the painted object for use within an analysis computer program or programs. The image data 1404 is placed at 1406 into a particular color space, such as L*,a*,b* so that pre-specified features can be extracted. Extracted features can include any color or appearance features needed for the matching process.

The feature extraction process 1408 parses the image data into regions of sub-images 1410. The degree of presence (or absence) of a feature within a sub-image is used to generate at 1412 the distribution 1414 of the feature across the sub-images 1410. Additionally, statistical measures are generated at 1412 to describe more completely the distribution 1414 of the features within the image data 1404. For example, statistical measures to describe the feature distribution 1414 can include standard deviations, means, skewness measures, kurtosis measures, etc. It is noted that spatially localized color phenomena in metallic paints cannot be captured by reflectance alone.

A computer-implemented non-transient storage medium or mediums 1416 store the distribution and statistical data that characterize the extracted features. Machine learning model(s) 1418 are applied to the stored data in order to predict the type of flake or flakes present in the target coating. The machine learning model(s) 1418 may utilize supervised training, unsupervised training, or a combination thereof. Examples of suitable machine-learning models include, but are not limited to, linear regression, decision tree, k-means clustering, principal component analysis (PCA), random decision forest, neural network, or any other type of machine learning algorithm known in the art. In an embodiment, the machine-learning model is based on a multi-layer artificial neural network.

One or more machine learning models 1418 predict the flake types present in the target coating. The prediction output 1420 can represent a scale of most probable to least probable types of flakes present in the target coating. The formulation process can use the automatically determined flake types as part of a paint formula for matching to the target coating.

Figure 22:
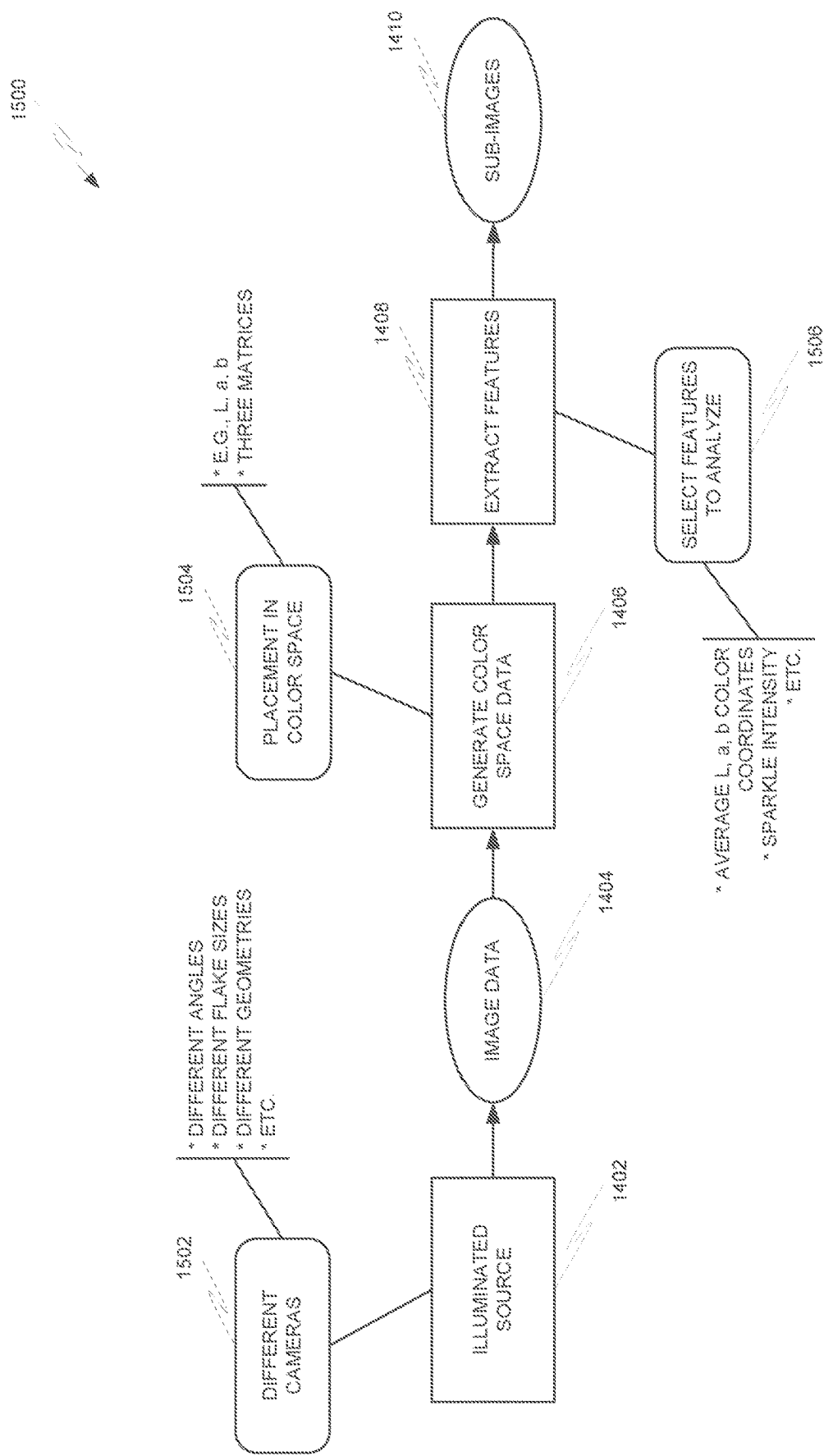

FIG. 22 depicts at 1500 an example configuration of the process in FIG. 21. With reference to FIG. 22, the illuminated source 1402 can be an electronic imaging device for capturing images under a wide range of electromagnetic wavelengths including visible or invisible wavelengths. The electronic imaging device may include one or more of different types of cameras 1502, such as a camera that is part of a mobile device. Examples of mobile devices include, but are not limited to, a mobile phone (e.g., a smartphone), a mobile computer (e.g., a tablet or a laptop), a wearable device (e.g., smart watch or headset), or any other type of device known in the art configured to receive the target image data. The illumination of the coated target can be at different angles for capturing different flakes sizes and geometries.

After the image data 1402 is captured, the system can use multiple matrices (e.g., three matrices, etc.) to represent the color space. For example, data structures to store three matrices 1504 can be configured in the following manner. In an embodiment, three separate data structures can store each of the L* values matrix, a* values matrix, and b* values matrix. The values are for each pixel in the entire captured image or a portion of the captured image. The values stored in the matrices are conversions from RGB color space into L*, a*, b* color space. The RGB color space is device dependent (e.g., different for each camera). Conversion into the L*, a*, b* color space allows the subsequent calculations to be device independent.

Based on the color-related data stored in the data structures, the feature extraction process 1408 selects which features to analyze for determining the flake type or types of the target coating. For example, the feature extraction process can extract features at 1506 for the sub-images 1410, such as average L*, a*, b* color coordinates, sparkle intensity, flake size, etc.

Figure 23:
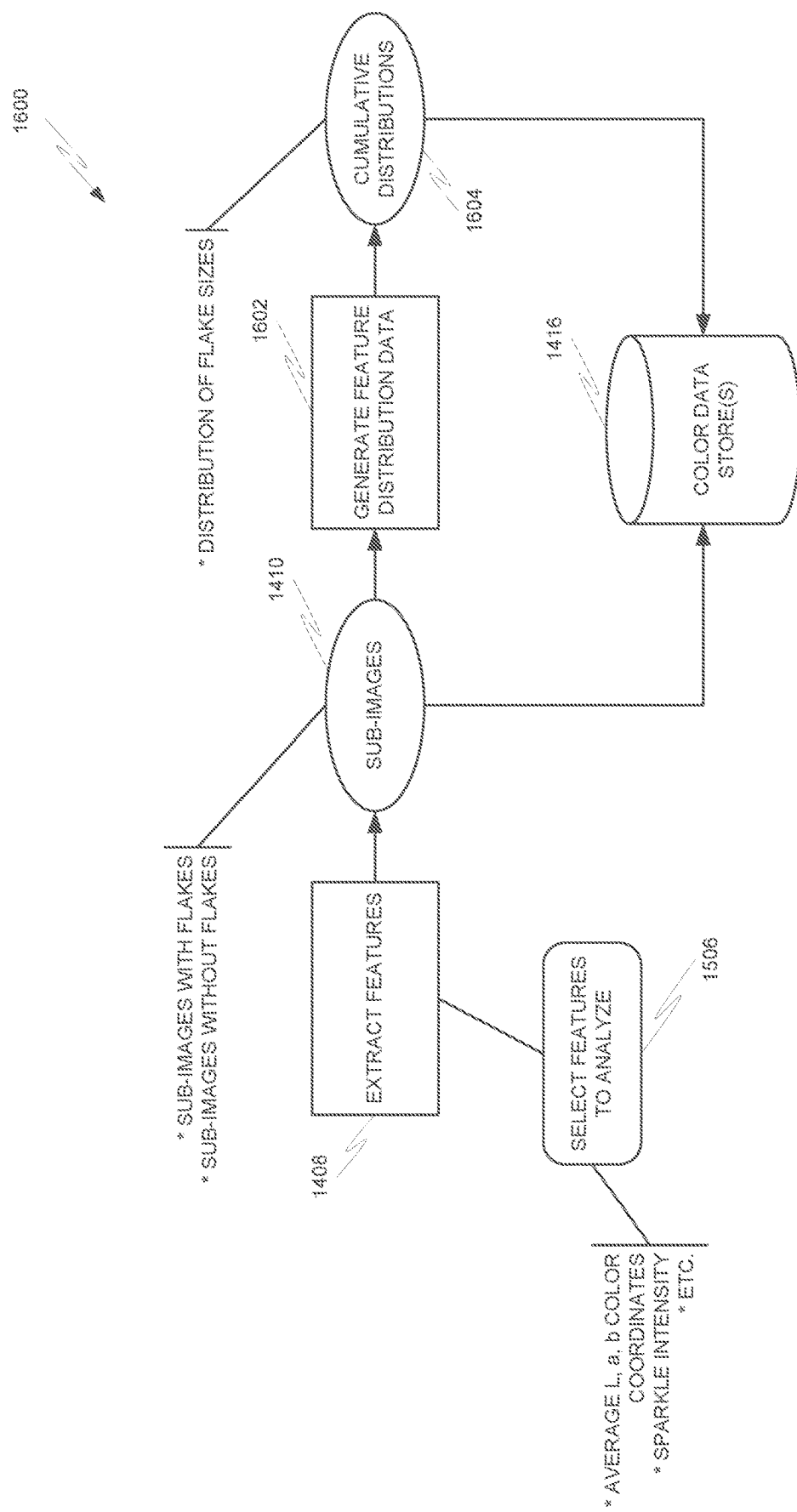

FIG. 23 depicts at 1600 an example configuration for further processing the data contained in the sub-images 1410. The sub-images 1410 can be analyzed at 1602 to determine the distribution 1604 of one or more features across the sub-images. For example, the system can determine within a sub-image how many pixels include a sparkle associated with a flake and a total number of such pixels. The system can further analyze the "size" feature associated with a flake in order to determine the distribution 1604 of flake sizes across the sub-images 1410.

Figure 24:
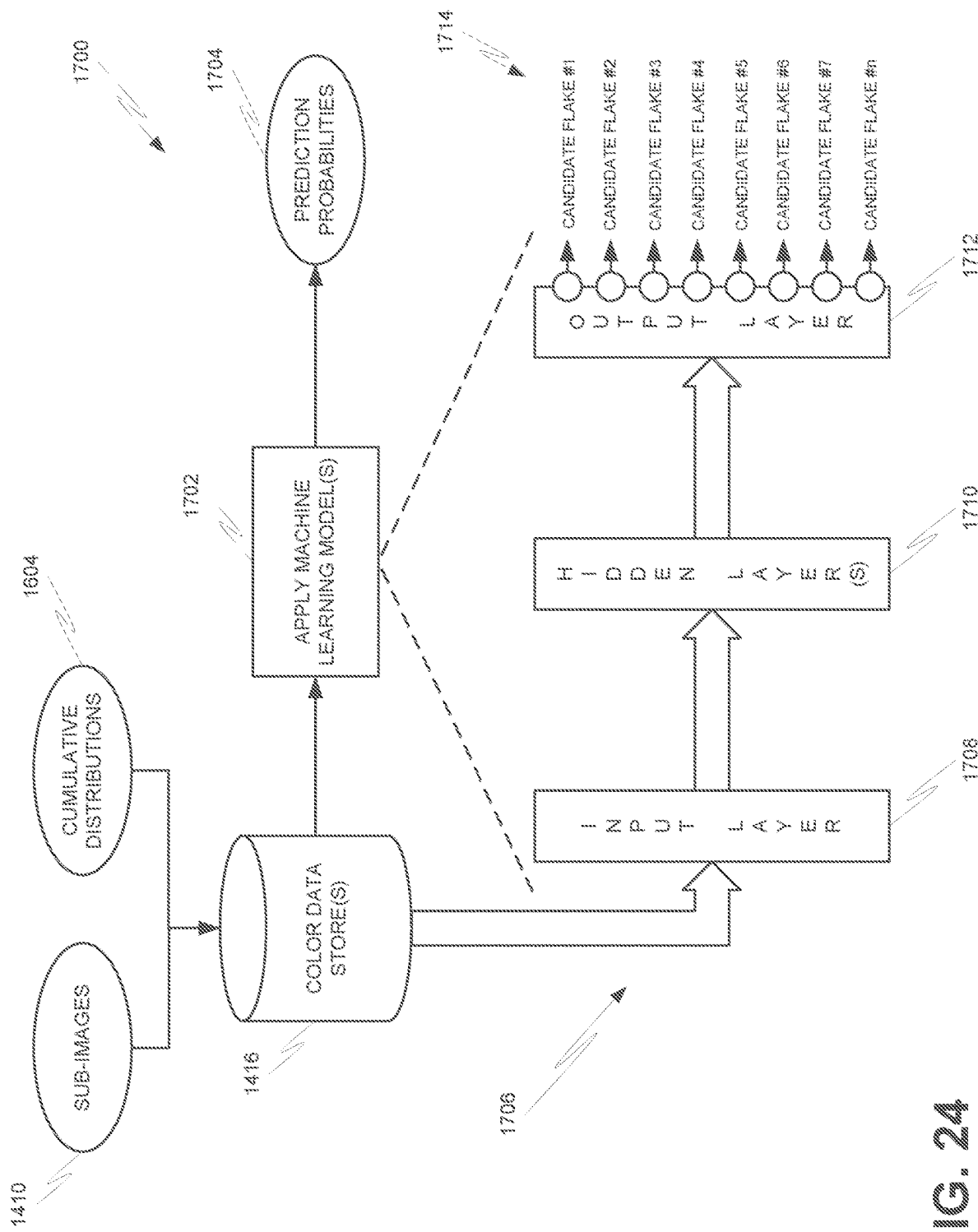
FIG. 24 depicts a machine learning model being applied to the target coating feature distribution and statistical data.

FIG. 24 depicts at 1700 an example configuration of a machine learning model being applied at 1702 to the feature distribution and statistical data that is stored in the color data storage medium or mediums 1416 in order to generate prediction probabilities 1704. The example configuration uses an artificial neural network 1706 to predict flake types based on the input feature distribution and statistical data.

The artificial neural network 1706 can be structured with an input layer 1708, one or more hidden layers 1710, and an output layer 1712. The input layer 1708 can be provided with one or more input nodes to receive feature distribution and statistical information related to the image from the target coating. One or more hidden layers 1710 within the artificial neural network 1706 help to identify interrelationships within the input data. Because the interrelationships can be non-linear in nature, the artificial neural network 1706 can be better at recognizing patterns or desired objects (e.g., flakes or pixels associated with flakes) within the data set from the color data storage medium or mediums 1416. The nodes of the artificial neural network 1706 can use many different types of activation functions, such as the sigmoid activation function, logistic activation function, etc.

The output layer 1712 of the artificial neural network 1706 provides predictions at 1714 indicating the probability that a particular flake is present. The prediction output can represent a scale of most probable to least probable types of flakes present in the target coating. The predictions can also be provided as the top-n set of flake results.

In one embodiment, the artificial neural network that is executed on one or more processors is a convolutional neural network that is trained on a set of labelled image data to learn features for each type of object within an image. The set of labelled image data includes information that identifies a class of each object and labelled sub-images. During training, an artificial neural model can predict the categories based on the features. Because the interrelationship between the training input images and categories are pre-defined, a training module can adapt the model's predictions to match the pre-defined associations between the input images and the features. Once the model has been trained, the machine learning classifier can predict flake categories based on the data.

It should be understood that other machine learning models can be used, such as random forest, decision tree models. The machine learning models used within the systems disclosed herein include empirical machine learning models that are trained on data generated during a practical application (e.g., color-related data resulting from a spraying application, etc.).

Figure 25:
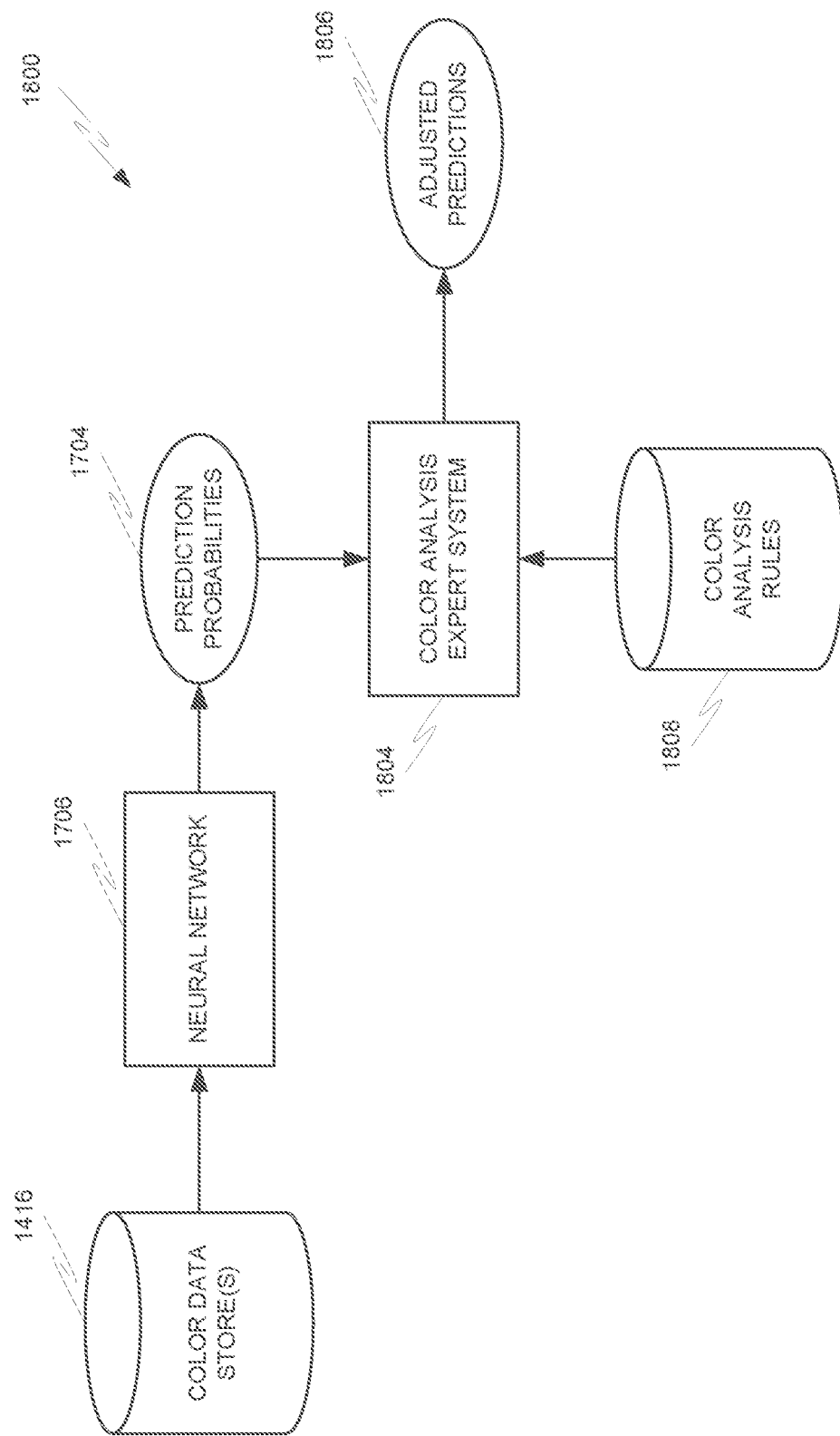
FIG. 25 depicts a color analysis expert system applying color analysis expert rules to output flake prediction probabilities.

It should also be understood that the output prediction probabilities from a model can be further analyzed. FIG. 25 provides at 1800 an example where a color analysis expert system 1804 applies its color analysis rules 1808 to the output prediction probabilities 1704 to determine whether one or more of the output candidate flakes are more or less likely to be present in the sub-images of the target coating. For example, the color analysis expert system 1804 may determine that two flakes are not commonly present for a coating and adjust the probability predictions at 1806 to reflect this practical level of detail.

Figure 26:
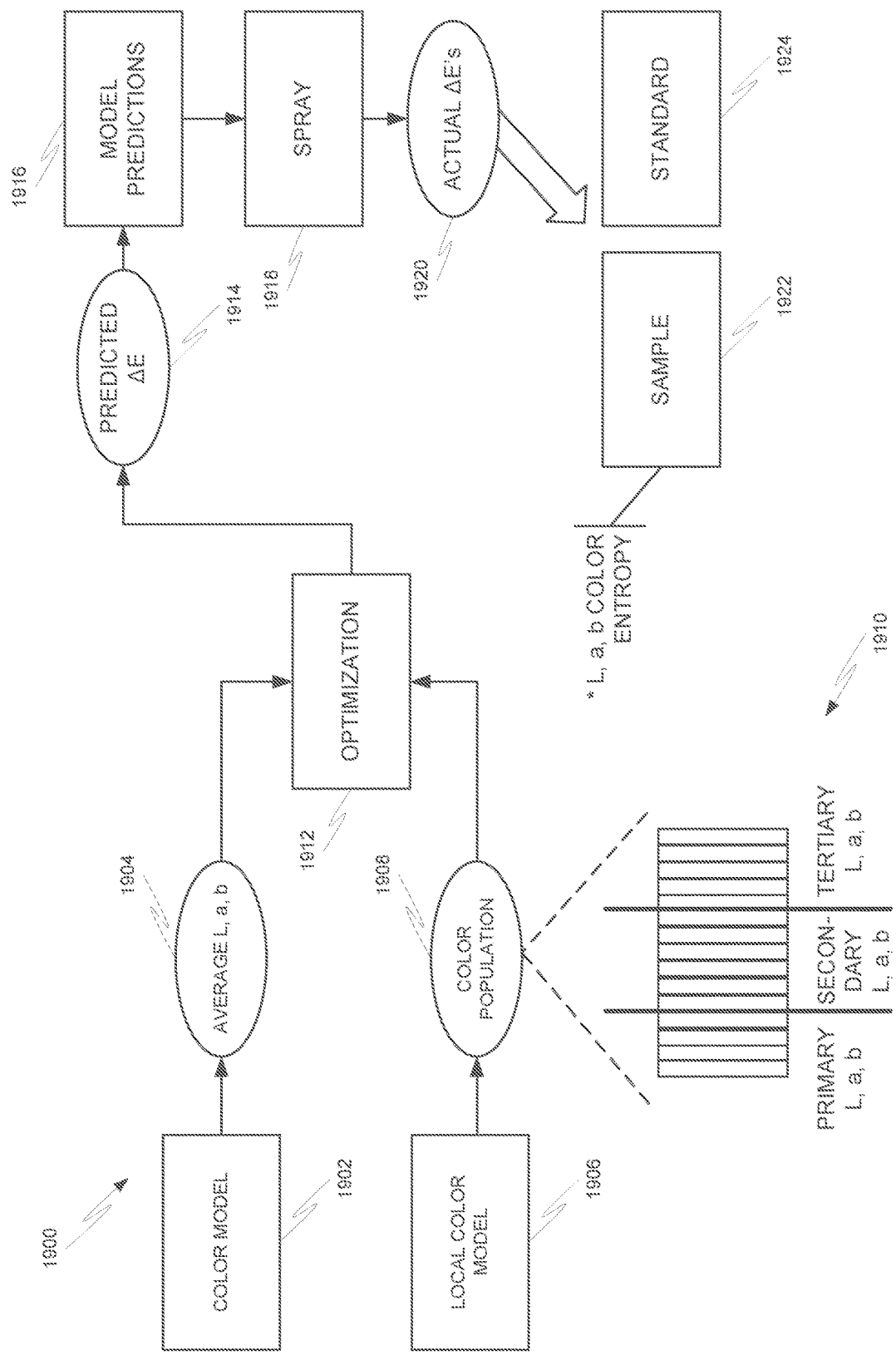
FIG. 26 depicts a system for assisting a shader in understanding and correcting for differences in spatial color.

FIG. 26 depicts at 1900 a system to help a shader understand and correct for differences in spatial color by analyzing and correcting for differences in multi-angle spatially-averaged color. This can be beneficial for such tools as an image-based color formula retrieval system for shaders to use.

The system of FIG. 26 receives a target image of the target coating that contains target image data. A color model 1902 and a local color model 1906 help to predict color differences 1914 between the target coating and a sample coating based at least in part upon the average L*, a*, b* 1904 generated by the color model 1902 and the color population 1908 generated from the local color model 1906.

The local color model 1906 predicts spatial color features (e.g., color entropy features, etc.) from the image data that are not "averaged" data as that information is provided by the color model 1902. To generate the color population 1908, the color space is divided as shown at 1910 into a primary color region, a secondary color region, and a tertiary color region. As a non-limiting example, each pixel in the image can be classified based on to which color family it belonged. Another non-limiting approach includes modeling the distribution of colors and determining to which group it belongs. Such approaches provide an overall characterization breakdown of the color population. In an embodiment, the local color model generates the color population by, for example, forming groups or clusters of similar color feature data. In an embodiment, a k-means clustering approach can form clusters of primary L*, a*, b* values, secondary L*, a*, b* values, and tertiary L*, a*, b* values. In this example, "k" in the k-means clustering approach would be three so that three clusters are formed.

Outputs from the color model 1902 and the local color model 1906 are used by an optimization routine 1912 to generate predicted color differences 1914 (e.g., delta E's). The optimization routine 1912 can include, for example, a numerical algorithm to generate a formula that optimizes the predicted color difference relative to a standard. In an embodiment, the numerical algorithm tests different formulas and determines which predicted color difference relative the standard for a formula is the smallest. A non-limiting example includes a function that generates a color difference metric based upon a paint formula, the model of the color phenomena, and the color metric associated with the standard. The formula that minimizes the function is selected. In this way, empirical models relating formula and various localized color features can be used for color matching.

Different optimization routines for the function can be used, such as a non-linear program numerical approach, a linear program numerical approach, etc. In the optimization routine, a function can be minimized in order to identify the smallest predicted color difference relative to the standard. The function could generate, for example, predictions of the average delta Es for the color model 1902 and the local color model 1906 relative to the standard.

In an embodiment, the predicted color differences 1914 are optimized using a relaxed constraint process. The relaxed constraint process can include optimizing an objective function for color differences subject to constraints whose coefficients are allowed to be relaxed. A penalty function is used within the color differences optimization routine to provide for the constraint relaxation. The optimized color differences determine automotive paint components for spraying at 1918 a substrate. The model predictions 1916 that have an acceptable delta E can be sprayed so that actual delta E's 1920 can be obtained. The sprayed sample 1922 is then compared to the standard 1924 in order to determine whether an acceptable match has been obtained (e.g., the delta E between the sample and the standard is within a pre-specified threshold, etc.). If it is unacceptable, then the process can iterate until an acceptable match has been achieved as shown in FIG. 27.

Figure 27:
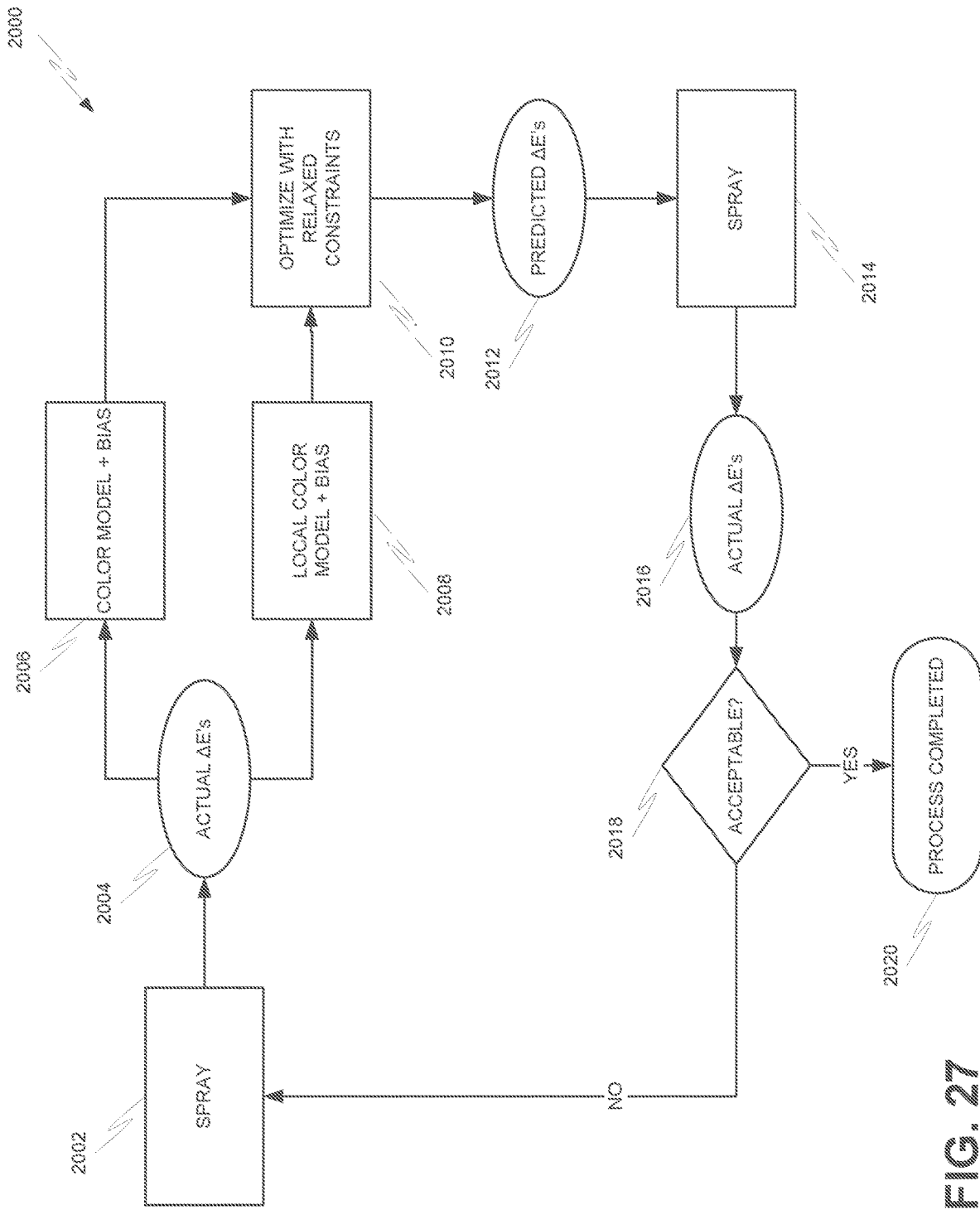
FIG. 27 depicts a process flow for determining when an acceptable match has been achieved for a shader.

FIG. 27 depicts at 2000 a process flow for determining when an acceptable match has been achieved for a shader. A shader performs an initial spray at 2002 to try to match to the target coating. Color space data is obtained by a color-measurement device (e.g., a spectrophotometer, etc.).

Color differences 2004 between the initial spray and the target coating are provided as input at 2006 to the color model with bias and to the local color model with a prediction bias at 2008. A prediction bias can be determined based on the difference between the predicted delta E and the actual delta E that was obtained after the selected formula was used to spray a sample. The bias is used to correct the predictions after the first iteration.

The two color models can be optimized at 2010 in many different ways. In an embodiment, optimization can be performed using a relaxed constraint approach. The optimization results in new color differences 2012 being predicted. The shader uses the predicted color differences 2012 in the paint formulation software to generate a new formula to spray at 2014. If the color differences 2016 from the additional spray are acceptable as determined at 2018, then the shading process has completed at 2020. If the color differences are not acceptable as determined at 2018, then an additional spraying and analysis iteration is performed until an acceptable color difference as determined at 2018 has been obtained.

Figure 28:
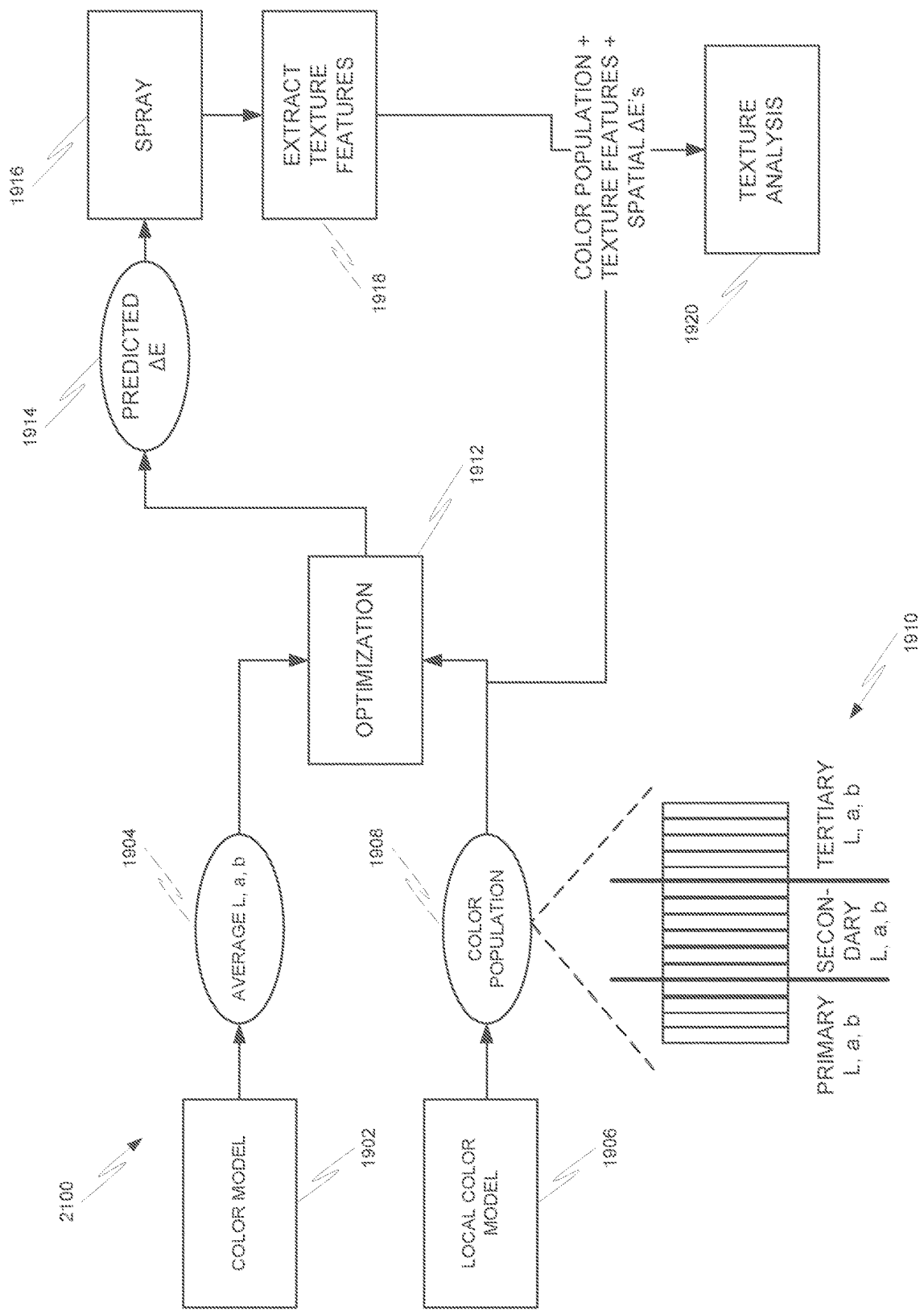
FIG. 28 depicts a system for analyzing a target coating for texture matching.

FIG. 28 depicts at 2100 the system being extended to analyze a target coating for texture matching. Texture matching can include any features that describe local color phenomena. It should be noted that this does not include orange peel resulting from sprayed paint.

In another embodiment, texture matching is technically difficult because the texture can vary over a given area, such as with respect to not only coarseness but also gloss, micro-brilliance, cloudiness, mottle, speckle, sparkle, or glitter. Texture to be matched can be described as the visual surface structure in the plane of the paint film according to the size and texture of the small constituent members of the material. Texture does not include the roughness of the paint film, such as orange peel, but includes visual irregularities in the plane of the paint film. Structures smaller than what the human eye can see contribute to color, while larger structures contribute to texture.

The system examines at 1920 the color population, the texture features of the target coating, and the delta "E's" (color differences) across the target to determine the distribution of coarseness across the target coating. Texture features are extracted at 1918 for matching the texture property of the paint film (that was sprayed at 1916) on the substrate to be matched.

It should be understood that a texture machine learning model can calculate the paint formulation with matched texture characteristics. The machine learning model can examine the particle size distribution of the paint to be matched, such as by examining the dark and light areas in the image data. A machine learning model, such as a convolutional neural network, can be applied to the texture data set to predict the formulations while not deviating from an acceptable color match based on the delta E measurements.

In an embodiment, a convolutional neural network can be configured so that its convolution operators extract texture features from the input image. A configuration is established through supervised training such that it preserves the spatial relationship between pixels in the images. More specifically, the convolutional neural network learns the optimal filter values with the number of filters being set to extract the desired number of texture features. For example, if more texture features are needed for the texture matching process, then the number of filters increases commensurately.

Figure 29:
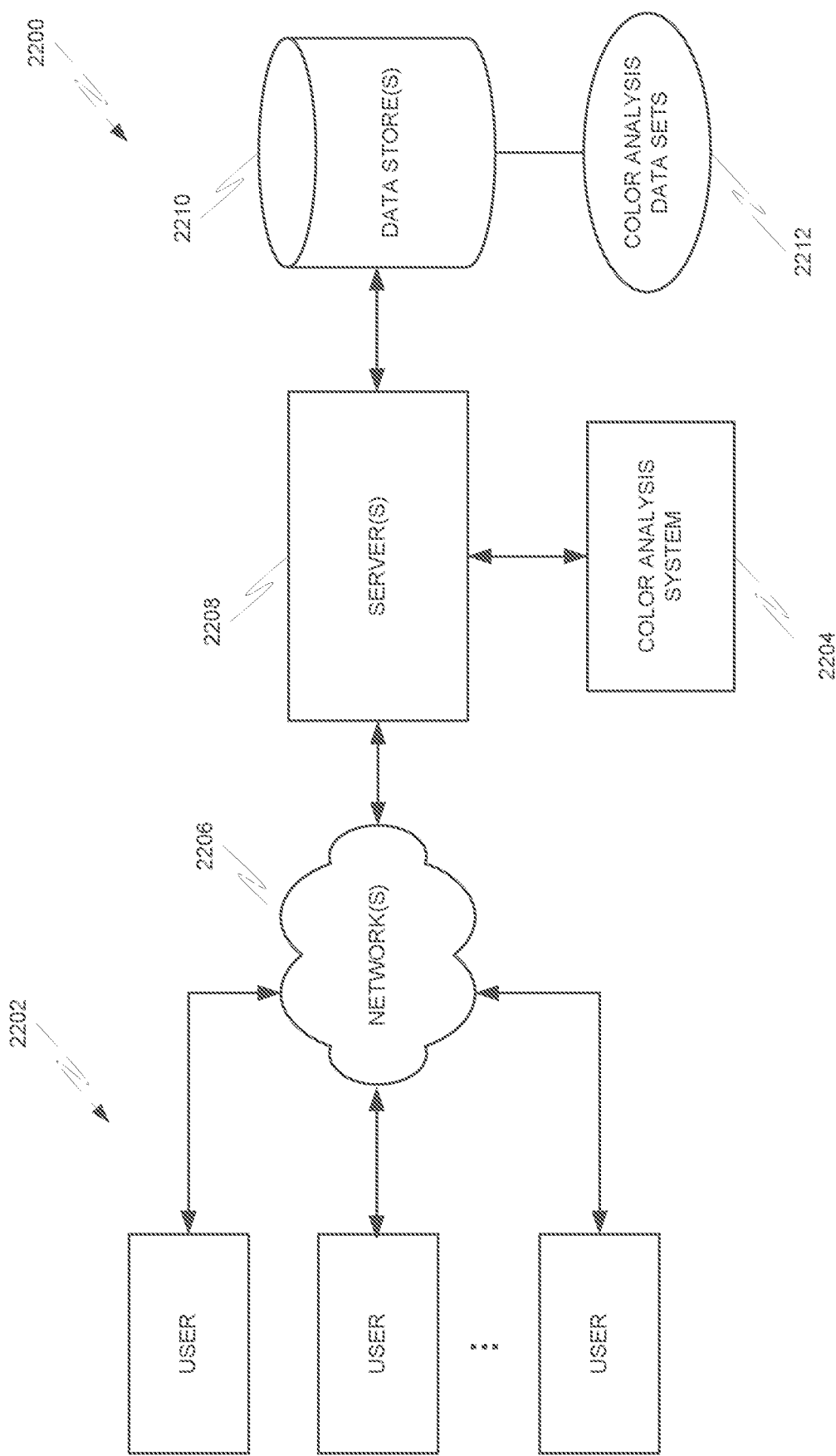
FIG. 29 depicts a server environment where users can interact with the color and appearance matching analysis system.

FIG. 29 depicts at 2200 a server environment where users 2202 can interact with the color and appearance matching analysis system 2204. The users 2202 can interact with the system 2202 through a number of ways, such as over one or more networks 2206. Server(s) 2208 accessible through the network(s) 2206 can host the system 2204. One or more data stores 2210 can store the color analysis data 2212 to be analyzed by the system 2204 as well as any intermediate or final data generated by the system.

The system in FIG. 29 can be an integrated web-based reporting and analysis tool that provides users flexibility and functionality for performing color and appearance matching analysis. It should be understood that the system could also be provided on a stand-alone computer for access by a user.

While at least one embodiment has been presented in the foregoing detailed description, it should be appreciated that a vast number of variations exist. It should also be appreciated that the embodiment or embodiments are only examples, and are not intended to limit the scope, applicability, or configuration in any way. Rather, the foregoing detailed description will provide those of ordinary skill in the art with a convenient road map for implementing an embodiment, it being understood that various changes may be made in the function and arrangement of elements described in an embodiment without departing from the scope as set forth in the appended claims and their legal equivalents.

What is claimed is:

1. A system for matching texture of a target coating comprising:
   a storage device for storing instructions;
   one or more data processors configured to execute instructions to:
   receive a target image of the target coating, wherein the target image comprises target image data;
   apply a texture feature extraction analysis process to the target image data to determine target image texture features, wherein the texture feature extraction analysis process includes determining distribution of particle sizes within sub-images of the target image, wherein a data spread statistical measure and a center statistical measure are determined to indicate the distribution of particle sizes;
   wherein the data spread statistical measure is a standard deviation statistical measure of the distribution of particle sizes and the center statistical measure is a mean of the distribution of the particle sizes, wherein a kurtosis statistical measure and a skewness statistical measure are determined to describe the distribution of particle sizes;
   determine target image texture features for the sub-images, wherein a sub-image includes different particles, and
   apply a machine learning model to match texture features present in the target coating using the determined target image texture features, wherein the texture features include visual irregularities associated with the target image.

2. The system of claim 1, wherein the texture features include one or more in combination of the following characteristics: coarseness, gloss, micro-brilliance, cloudiness, mottle, speckle, sparkle, and glitter.

3. The system of claim 2, wherein the texture features do not include roughness associated with the target image.

4. The system of claim 1, wherein the one or more data processors are configured to execute instructions to retrieve the machine learning model to determine the matching of the texture features.

5. The system of claim 4, wherein the machine-learning model is a convolutional neural network configured to extract and analyze the texture features.

6. The system of claim 1, wherein color population, the determined texture features of the target coating, and color differences across the target image are used to determine distribution of coarseness across the target coating.

7. The system of claim 1, wherein the one or more data processors are configured to receive the target image data of the target coating, wherein the target image data corresponds to a plurality of images of the target coating with varying angles of light relative to an imaging device.

8. The system of claim 1, wherein the one or more data processors are configured to receive the target image data of the target coating, wherein the target image data correlates to a plurality of images of the target coating with varying magnification.

9. The system of claim 1 wherein the target coating is a metallic coating, a pearlescent coating, or a combination thereof.

10. A method for matching texture of a target coating comprising:
    receiving, by one or more data processors, a target image of the target coating, wherein the target image comprises target image data;
    applying, by the one or more data processors, a texture feature extraction analysis process to the target image data to determine target image texture features, wherein the texture feature extraction analysis process includes determining distribution of particle sizes within sub-images of the target image, wherein a data spread statistical measure and a center statistical measure are determined to indicate the distribution of particle sizes;
    wherein the data spread statistical measure is a standard deviation statistical measure of the distribution of particle sizes and the center statistical measure is a mean of the distribution of the particle sizes, wherein a kurtosis statistical measure and a skewness statistical measure are determined to describe the distribution of particle sizes;
    determining, by the one or more data processors, target image texture features for the sub-images, wherein a sub-image includes different particles, and
    applying, by the one or more data processors, a machine learning model to match texture features present in the target coating using the determined target image texture features, wherein the texture features include visual irregularities associated with the target image.

11. The method of claim 10, wherein the texture features include one or more in combination of the following characteristics: coarseness, gloss, micro-brilliance, cloudiness, mottle, speckle, sparkle, and glitter.

12. The method of claim 11, wherein the texture features do not include roughness associated with the target image.

13. The method of claim 10, wherein the one or more data processors are configured to execute instructions to retrieve the machine learning model to determine the matching of the texture features.

14. The method of claim 13, wherein the machine-learning model is a convolutional neural network configured to extract and analyze the texture features.

15. The method of claim 10, wherein color population, the determined texture features of the target coating, and color differences across the target image are used to determine distribution of coarseness across the target coating.

16. The method of claim 10, wherein the one or more data processors are configured to receive the target image data of the target coating, wherein the target image data corresponds to a plurality of images of the target coating with varying angles of light relative to an imaging device.

17. The method of claim 10, wherein the one or more data processors are configured to receive the target image data of the target coating, wherein the target image data correlates to a plurality of images of the target coating with varying magnification.

18. The method of claim 10, wherein the target coating is a metallic coating, a pearlescent coating, or a combination thereof.

* * * * *